US006507865B1

(12) United States Patent
Hanson et al.

(10) Patent No.: US 6,507,865 B1
(45) Date of Patent: *Jan. 14, 2003

(54) METHOD AND SYSTEM FOR GROUP CONTENT COLLABORATION

(75) Inventors: Michael Hanson, Menlo Park, CA (US); Graham Miller, San Francisco, CA (US); Brian Axe, San Francisco, CA (US); Steven Richard Evans, Los Altos Hills, CA (US)

(73) Assignee: Zaplet, Inc., Redwood Shores, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/483,221

(22) Filed: Jan. 14, 2000

Related U.S. Application Data

(63) Continuation-in-part of application No. 09/427,152, filed on Oct. 25, 1999, and a continuation-in-part of application No. 09/427,378, filed on Oct. 25, 1999, and a continuation-in-part of application No. 09/426,648, filed on Oct. 25, 1999.
(60) Provisional application No. 60/151,650, filed on Aug. 31, 1999, and provisional application No. 60/151,476, filed on Aug. 30, 1999.

(51) Int. Cl.[7] .............................................. G06F 15/16
(52) U.S. Cl. ................... 709/206; 709/201; 709/204; 709/205; 709/231; 709/329; 705/36; 705/37
(58) Field of Search ................................ 709/201, 204, 709/205, 206, 231, 329; 705/36, 37

(56) References Cited

U.S. PATENT DOCUMENTS

| 4,503,499 A | 3/1985 | Mason et al. |
| 4,567,600 A | 1/1986 | Massey et al. |
| 4,645,873 A | 2/1987 | Chomet |

(List continued on next page.)

FOREIGN PATENT DOCUMENTS

| EP | 0 739 115 A2 | 10/1996 |
| EP | 1 085 444 A2 | 3/2001 |

OTHER PUBLICATIONS

"Lotus Notes 5 Releasestep by Step, A Beginner's Guide to Lotus Notes," 1995–1999, PP. 1–228.

"Quick Courses in Microsoft Outlook 2000," Microsoft Press, Online Press Inc., 1999, PP. 1–148.

Goldberg et al., *Active Mail–A Framework for Implementing Groupware* CSWC Proceedings Nov. 1992: 75–83.

Brothers et al., *Supporting Informal Communication Via Ephemeral Interest Groups* CSWC Proceedings Nov. 1992: 84–90.

Borenstein, Nathaniel S., *Computational Mail as Network Infrastructure for Computer–Supported Cooperative Work* CSWC Proceedings Nov. 1992: 67–74.

(List continued on next page.)

*Primary Examiner*—Saleh Najjar
(74) *Attorney, Agent, or Firm*—Hickman Palermo Truong & Becker LLP; Christopher J. Palermo

(57) ABSTRACT

A method and system are described that can be used to support content collaboration among a group of participants connected to a network. A participant creates an electronic form specifying the content and a list of network addresses corresponding to other participants in the content collaboration. A server receives the form and includes resources for delivering an electronic mail message associated with an electronic medium associated with the content collaboration. When the participant opens the message, the electronic medium is produced by the server that includes static and dynamic regions. The participant can modify or change the content. The dynamic regions are asynchronously updated in the server and indicate the current content of the electronic medium that can be accessed by other participants. The content may be binary or textual.

30 Claims, 17 Drawing Sheets

U.S. PATENT DOCUMENTS

| | | | |
|---|---|---|---|
| 5,043,876 A | 8/1991 | Terry | |
| 5,089,954 A | 2/1992 | Rago | |
| 5,093,901 A | 3/1992 | Cree et al. | |
| 5,093,918 A | 3/1992 | Heyen et al. | 395/725 |
| 5,129,057 A | 7/1992 | Strope et al. | |
| 5,161,214 A | 11/1992 | Addink et al. | |
| 5,245,532 A | 9/1993 | Mourier | |
| 5,299,305 A | 3/1994 | Oomae et al. | |
| 5,325,310 A | 6/1994 | Johnson et al. | |
| 5,363,507 A | 11/1994 | Nakayama et al. | |
| 5,377,354 A | 12/1994 | Scannell et al. | |
| 5,392,400 A | 2/1995 | Berkowitz et al. | |
| 5,408,470 A | 4/1995 | Rothrock et al. | |
| 5,410,646 A | 4/1995 | Tondevold et al. | |
| 5,418,908 A | 5/1995 | Keller et al. | 395/200 |
| 5,428,784 A | 6/1995 | Cahill, Jr. | |
| 5,535,332 A | 7/1996 | Ishida | |
| 5,537,142 A | 7/1996 | Fenouil | |
| 5,555,426 A | 9/1996 | Johnson et al. | |
| 5,557,723 A | 9/1996 | Holt et al. | 395/149 |
| 5,579,472 A | 11/1996 | Keyworth, II et al. | 395/326 |
| 5,592,626 A | 1/1997 | Papadimitriou et al. | |
| 5,602,841 A | 2/1997 | Lebizay et al. | |
| 5,608,872 A * | 3/1997 | Schwartz et al. | 709/205 |
| 5,615,269 A | 3/1997 | Micali | |
| 5,617,539 A | 4/1997 | Ludwig et al. | |
| 5,632,018 A | 5/1997 | Otorii | |
| 5,647,002 A | 7/1997 | Brunson | |
| 5,664,207 A | 9/1997 | Crumpler et al. | |
| 5,687,317 A | 11/1997 | Hughes et al. | |
| 5,689,642 A | 11/1997 | Harkins et al. | 395/200.04 |
| 5,692,125 A | 11/1997 | Schloss et al. | 395/209 |
| 5,732,400 A | 3/1998 | Mandler et al. | |
| 5,744,670 A | 4/1998 | Motoyuki et al. | 585/320 |
| 5,757,669 A | 5/1998 | Christie et al. | |
| 5,781,732 A | 7/1998 | Adams | |
| 5,790,677 A | 8/1998 | Fox et al. | |
| 5,794,207 A | 8/1998 | Walker et al. | |
| 5,796,396 A | 8/1998 | Rich | |
| 5,799,191 A | 8/1998 | Moriyasu et al. | |
| 5,799,320 A | 8/1998 | Klug | |
| 5,819,032 A | 10/1998 | de Vries et al. | 395/200.8 |
| 5,819,092 A | 10/1998 | Ferguson et al. | 395/701 |
| 5,819,274 A | 10/1998 | Jackson, Jr. | |
| 5,821,925 A | 10/1998 | Carey et al. | |
| 5,825,883 A | 10/1998 | Archibald et al. | |
| 5,826,242 A | 10/1998 | Montulli | 705/27 |
| 5,835,713 A | 11/1998 | Fitzpatrick et al. | |
| 5,842,178 A | 11/1998 | Giovannoli | |
| 5,848,396 A * | 12/1998 | Gerace | 705/10 |
| 5,850,430 A | 12/1998 | Hamalainen | |
| 5,850,517 A | 12/1998 | Verkler et al. | |
| 5,855,020 A | 12/1998 | Kirsch | |
| 5,862,330 A * | 1/1999 | Anupam et al. | 709/204 |
| 5,872,924 A | 2/1999 | Nakayama et al. | |
| 5,884,035 A | 3/1999 | Butman et al. | |
| 5,884,325 A | 3/1999 | Bauer et al. | |
| 5,892,761 A | 4/1999 | Stracke, Jr. | 370/395 |
| 5,897,622 A | 4/1999 | Blinn et al. | |
| 5,909,689 A | 6/1999 | Van Ryzin | |
| 5,911,045 A | 6/1999 | Leyba et al. | |
| 5,913,040 A | 6/1999 | Rakavy et al. | |
| 5,913,920 A | 6/1999 | Adams et al. | |
| 5,918,054 A | 6/1999 | Jury et al. | 395/712 |
| 5,923,848 A * | 7/1999 | Goodhand et al. | 709/219 |
| 5,930,471 A | 7/1999 | Milewski et al. | |
| 5,933,811 A | 8/1999 | Angles et al. | |
| 5,937,161 A | 8/1999 | Mulligan et al. | |
| 5,944,785 A | 8/1999 | Pommier et al. | |
| 5,945,989 A | 8/1999 | Freihat et al. | |
| 5,948,057 A | 9/1999 | Berger et al. | |
| 5,948,070 A | 9/1999 | Fujita | |
| 5,951,652 A * | 9/1999 | Ingrassia, Jr. et al. | 709/248 |
| 5,956,693 A | 9/1999 | Geerlings | |
| 5,960,404 A | 9/1999 | Chaar et al. | 705/8 |
| 5,963,947 A | 10/1999 | Ford et al. | |
| 5,966,512 A | 10/1999 | Bates et al. | |
| 5,970,479 A | 10/1999 | Shepherd | |
| 5,974,430 A | 10/1999 | Mutschler, III et al. | 707/505 |
| 5,987,376 A | 11/1999 | Olson et al. | |
| 5,995,096 A | 11/1999 | Kitahara et al. | |
| 5,995,097 A | 11/1999 | Tokumine et al. | |
| 6,006,200 A | 12/1999 | Boies et al. | |
| 6,009,410 A * | 12/1999 | LeMole et al. | 705/14 |
| 6,012,083 A | 1/2000 | Savitzky et al. | |
| 6,012,090 A | 1/2000 | Chung et al. | |
| 6,014,502 A * | 1/2000 | Moraes | 395/200.49 |
| 6,014,644 A | 1/2000 | Erickson | |
| 6,023,686 A | 2/2000 | Brown | |
| 6,025,841 A * | 2/2000 | Finkelstein et al. | 345/342 |
| 6,041,308 A | 3/2000 | Walker et al. | |
| 6,044,205 A | 3/2000 | Reed et al. | 395/200.31 |
| 6,044,403 A | 3/2000 | Gerszberg et al. | |
| 6,047,311 A | 4/2000 | Ueno et al. | 709/202 |
| 6,049,787 A | 4/2000 | Takashi et al. | |
| 6,055,519 A | 4/2000 | Kennedy et al. | |
| 6,055,522 A * | 4/2000 | Krishna et al. | 705/517 |
| 6,084,883 A | 7/2000 | Norell et al. | |
| 6,092,074 A | 7/2000 | Rodkin et al. | |
| 6,105,055 A * | 8/2000 | Pizano et al. | 709/204 |
| 6,115,384 A | 9/2000 | Parzych | |
| 6,134,582 A | 10/2000 | Kennedy | 709/206 |
| 6,141,010 A * | 10/2000 | Hoyle | 345/356 |
| 6,151,621 A | 11/2000 | Colyer et al. | 709/204 |
| 6,161,621 A | 11/2000 | Achacoso et al. | 710/4 |
| 6,155,840 A * | 12/2000 | Sallette | 434/323 |
| 6,161,137 A * | 12/2000 | Ogdon et al. | 709/224 |
| 6,161,149 A * | 12/2000 | Achacoso et al. | 710/4 |
| 6,173,316 B1 | 1/2001 | De Boor et al. | 709/218 |
| 6,182,052 B1 | 1/2001 | Fulton et al. | 705/26 |
| 6,185,602 B1 * | 2/2001 | Bayrakeri | 709/204 |
| 6,205,478 B1 | 3/2001 | Sugano et al. | 709/223 |
| 6,212,553 B1 | 4/2001 | Lee et al. | 709/206 |
| 6,219,054 B1 | 4/2001 | Komoda et al. | 345/353 |
| 6,226,670 B1 | 5/2001 | Ueno et al. | 709/207 |
| 6,230,156 B1 | 5/2001 | Hussey | 707/10 |
| 6,230,185 B1 * | 5/2001 | Salas et al. | 709/205 |
| 6,247,045 B1 | 6/2001 | Shaw et al. | 709/207 |
| 6,260,124 B1 | 7/2001 | Crockett et al. | 711/162 |
| 6,144,991 A1 * | 11/2001 | England | 709/205 |
| 6,317,777 B1 | 11/2001 | Skarbo et al. | 709/204 |
| 6,336,134 B1 | 1/2002 | Varma | 706/205 |
| 6,338,086 B1 | 1/2002 | Curtis et al. | 709/218 |

OTHER PUBLICATIONS

S. Dharap et al., "Multi–user distrbuted specification environments for Z," Technical report, Pennsylvania State University (1992), pp. 1–29.

S. Dharap et al., "The Z–Specificator: A multi–user distributed specification environment," Technical report, Pennsylvania State University (1992), pp. 1–26.

S. Dharap, "Coordinating Concurrent Development in Distributed Enviroments," Ph.D. thesis, Pennsylvania State University Department of Computer Science (May, 1995), pp. 1–98.

* cited by examiner

,600

Create a Group Greeting Card

Instigator's Name: [601]  Instigator's Email: [602]

Signer's Email: [603]

Greeting Type: ○ Birthday ○ Holiday ○ Sympathy ○ Get Well ○ Other
Greeting Style: ○ Formal ○ Casual ○ Humor ● Personal ○ Other
Cover Image: [Select ▽]  Inside Saying: [Select ▽]
Title: [                    ]
Background: [                    ]

Recipient's Name: [    ]  Recipient's Email: [    ]

Send to Recipient: [    ]  [Pick Date and Time]
607                          607

[Preview]   [Send to Signers Now]
605                          606

Sign a Group Greeting Card — 715

Your Name: | Joe Smith | (716)  Your Email: | Joe_smith@aol.com | (717)

Your Visible Comment: | Please get well very soon! Joe | 718

Page: ○ Cover  ○ Inside Cover  ● Inside  ○ Back  ○ Anywhere

Angle: ● Horizontal  ○ Angled  ○ Vertical  ○ Upside Down

Quadrant: ○ NW  ● NE  ○ SE  ○ SW  ○ Anywhere

720 {

Font: | Comic Sans ▽ |   Font Face: | Italics ▽ |

Font Color: | Black ▽ |   Font Size: | 14pts ▽ |

Your Private Message to Recipient: | This place is crazy without you! | 719

[Preview] 705    [Submit] 706

Sales Forecast FY 2000

*Please review your territory and for each account please provide a status, last year's results, this year's forecast and variance between the two.*

Complete task by: Dec. 31, 1999 11:59pm

Your Name: John North    Your Comments: It's going to be a great quarter

Your Email: ____

[ Submit ]   [ Reset ]

| Sales Rep. | Account Name | Status | Previous Yr. | Forecast | Var. |
|---|---|---|---|---|---|
| Bob West | XYZ Corp. | Current | $1,000,000 | $2,000,000 | +1000 |
| | ABC Corp. | Lead | $0 | $150,000 | +150 |
| | Blue Corp. | Proposal | $0 | $200,000 | +200 |
| Sally East | 123 Corp. | Current | $1,250,000 | $1,000,000 | -250 |
| | Red Corp. | Current | $1,000,000 | $2,000,000 | +1000 |
| | Pink Inc. | Lead | $0 | $250,000 | +250 |
| 923 | | | | | |
| | | | | | |
| | | | | | |
| | | | | | |
| | | | | | |

*FIG. 13*

Sales Forecast FY 2000

*Please review your territory and for each account please provide a status, last year's results, this year's forecast and variance between the two.*

*Complete task by: Dec. 31, 1999 11:59pm*

Your Name: _____    Your Comments: _____

Your Email: _____

[Submit]  [Reset]

| Sales Rep. | Account Name | Status | Previous Yr. | Forecast | Var. |
|---|---|---|---|---|---|
| Bob West | XYZ Corp. | Current | $1,000,000 | $2,000,000 | +1000 |
| | ABC Corp. | Lead | $0 | $150,000 | +150 |
| | Blue Corp. | Proposal | $0 | $200,000 | +200 |
| Sally East | 123 Corp. | Current | $1,250,000 | $1,000,000 | -250 |
| | Red Corp. | Current | $1,000,000 | $2,000,000 | +1000 |
| | Pink Inc. | Lead | $0 | $250,000 | +250 |
| John North | Open Inc. | Current | $5,000,000 | $7,000,000 | +2000 |
| | Black Corp. | Current | $6,000,000 | $8,000,000 | +2000 |
| | Yellow Inc. | Current | $250,000 | $1,000,000 | +750 |
| | | | | | |
| | | | | | |
| 923 | | | | | |

Comments:
John North. It's going to be a great quarter

| Your Name: | 1001 | Your Email: | 1002 |

Send To: 1003

Subject: 1004

Instructions: 1005

Portfolio Name: "Big returns" Investment Club

Enter Ticker Symbols: [ ]

1006 {

Enter Advanced Details:
- ☐ Shares Owned
- ☐ Purchase Price/Share
- ☐ Trade History
- ☐ Commissions
- ☐ Notes Deadline For Picks:
- Jan.
- 01
- 1999

"Big Returns" Investments Club Stock Tracker

The markets are going crazy! Let's all review our portfolio, make recommendations and decide what to do with our investments.

Your Name: Suzie QQ    Your Comments: Hold it all except Yahoo

Your Email:

[Submit]  [Reset]

Mon. Dec. 20  3:58 ET

| Symbol | Last Trade | Change | Shares Owned | Purchase Price | Hold | Sell |
|--------|-----------|--------|--------------|----------------|------|------|
| AMZN | 97 1/4 | +3 1/16 | 100 | 81 | 0 | 0 |
| YHOO | 364 11/16 | +7/8 | 57 | 165 | 0 | 0 |
| AOL | 85 7/8 | -5 | 1,100 | 42 | 0 | 0 |
| CNET | 74 | +2 1/4 | 779 | 36 | 0 | 0 |
| MSFT | 112 3/8 | -2 7/8 | 363 | 77 | 0 | 0 |
| PCLN | 55 3/4 | -1 3/16 | 1,000 | 94 | 0 | 0 |

Investment Decisions

AMZN  Hold  (2 Votes Hold, 0 Sell)
YHOO  Sell  (2 Votes Sell, 0 Hold)
AOL   Hold  (2 Votes Hold, 0 Sell)
CNET  Hold  (2 Votes Hold, 0 Sell)
MSFT  Hold  (2 Votes Hold, 0 Sell)
PCLN  Hold  (2 Votes Hold, 0 Sell)

Comments

John Doe - We're kicking but. But let's sell YHOO
Jack Public - I agree let's sell YHOO.
Suzie QQ
Phil Harmonic
Ben Dover

*FIG. 16*

"Big Returns" Investments Club Stock Tracker

The markets are going crazy! Let's all review our portfolio, make recommendations and decide what to do with our investments.

Your Name: [____]  Your Comments: [____]

Your Email: [____]

[Submit]  [Reset]

Mon. Dec. 23  4:00 ET

| Symbol | Last Trade | Change | Shares Owned | Purchase Price | Hold | Sell |
|--------|-----------|--------|--------------|----------------|------|------|
| AMZN | 100 | +10 | 100 | 81 | 0 | 0 |
| YHOO | 327 | -27 | 57 | 165 | 0 | 0 |
| AOL | 94 | +4 | 1,100 | 42 | 0 | 0 |
| CNET | 77 | +3 | 779 | 36 | 0 | 0 |
| MSFT | 170 | +30 | 363 | 77 | 0 | 0 |
| PCLN | 61 3/4 | +4 | 1,000 | 94 | 0 | 0 |

Investment Decisions

AMZN  Hold  (Unanimous)
YHOO  Hold  (1 Hold, 4 Sell)
AOL   Hold  (Unanimous)
CNET  Hold  (Unanimous)
MSFT  Hold  (Unanimous)
PCLN  Hold  (Unanimous)

Comments

John Doe - We're kicking but. But let's sell YHOO
Jack Public - I agree let's sell YHOO
Suzie QQ - Hold it all except YHOO
Phil Harmonic - I agree
Ben Dover - Let's hold everything!

*FIG. 17*

METHOD AND SYSTEM FOR GROUP CONTENT COLLABORATION

PROVISIONAL APPLICATION DATA

The present invention claims priority to United States Provisional Patent Application Nos. 60/151,650, filed Aug. 31, 1999 and 60/151,476, filed Aug. 30, 1999, both entitled SYSTEMS AND METHODS FOR MESSAGING WITH DYNAMIC CONTENT, naming inventors Michael Hanson, Graham Miller, and Brian Axe, and is incorporated by reference as if fully set forth herein.

CROSS-REFERENCE TO RELATED APPLICATIONS

The present application is a continuation-in-part application of co-pending U.S. patent application Ser. No. 09/427,152 entitled METHOD FOR COMMUNICATING INFORMATION AMONG A GROUP OF PARTICIPANTS, filed Oct. 25, 1999 pending; Ser. No. 09/426,648 entitled SYSTEM FOR COMMUNICATING INFORMATION AMONG A GROUP OF PARTICIPANTS, filed Oct. 25, 1999 pending; and Ser. No. 09/427,378 entitled ELECTRONIC MEDIA FOR COMMUNICATING INFORMATION AMONG A GROUP OF PARTICIPANTS, filed Oct. 25, 1999 pending; invented by Michael Hanson, Graham Miller, and Brian Axe; and such applications are incorporated by reference herein as if fully set forth herein.

The present application is also related to co-pending application Ser. No. 09/483,508, entitled METHOD AND SYSTEM FOR PROCESS INTERACTION AMONG A GROUP, filed Jan. 14, 2000, and co-pending application Ser. No. 09/483,361, entitled SYSTEM AND METHOD FOR GROUP CHOICE MAKING, filed on Jan. 14, 2000 both currently pending, invented by Michael Hanson, Graham Miller, Brian Axe, and Steve Evans; and such applications are incopoated by reference as if fully set forth herein.

TECHNICAL FIELD

The present invention relates generally to communication networks, and more particularly, to a method and system of content collaboration among a group of participants connected to such networks using a dynamic distribution of data.

BACKGROUND OF THE INVENTION

Currently, group content collaboration tools are known that can be used to assist multiple participants to collaborate to modify content. Examples of content include binary content, such as images, and textual content.

One type of group content collaboration uses store and forward technology. Initially, a message is sent to participants with some attached content. Participants are able to respond to the message with any changes to the content. Typically, the sender of the message accepts the changes from the other participants, and must manually merge the changes.

This type of tool has several drawbacks. First, intermediate results of the content change process are not available in an aggregated form. This may prevent individuals from making the best possible content changes for the group. Further, messages with content changes may be scattered within or could be missing from a participant's electronic mail in-box. This can cause a participant to be uninformed about important changes to the content or require him or her to analyze multiple messages with varying content changes to understand the aggregated form of the content. This means that the participant does not benefit from seeing or contemplating changes made by other participants, since the content is only current when sent to each of the participants. As a result, changes made by a participant to the content may be duplicated or the content may no longer be relevant. This causes inefficiency within the collaborative environment. Further, each participant may send responses back to the sender and other participants of the message in varying formats. This can make aggregating or summarizing changes to the group content collaboration difficult. Finally, there is no aggregated immediate feedback to a participant as to how his or her changes have affected the group content collaboration process. Ultimately, the participants are prevented from having a complete picture of the current state of the content collaboration.

Another drawback to the above group content collaboration tool is that content is often distributed using electronic mail. In this case, participants attach content as a file using a number of known tools. However, this causes the content to be duplicated and stored on a number of mail servers and clients. This can waste bandwidth and can cause bottlenecks in the network.

Another type of group content collaboration tool is real time conferencing. In this case, an electronic forum is established in which participants manipulate content such that changes are immediately reflected to each participant. Participants are expected to focus their attention and continually respond during a real time conferencing session. For example, many participants may participate in a white board conferencing system.

Real time group content collaboration tools suffer from several drawbacks. One drawback is that real time conferencing requires participants to interact at the same time. This may be unduly burdensome and may be inconvenient to some or all of the participants. Additionally, participants may not be able to effectively collaborate when the group becomes too large. Further, real time conferencing typically operates in a proprietary environment. This means that each participant must match-up with complimentary services to participate in the conference. This can require increased costs and additional navigation for and set-up of non-proprietary participants. This can limit and exclude the number of participants that can collaborate in a group. Additionally, proprietary tools can consume significant computer resources, such as memory.

Another type of group content collaboration tool, such as source code control systems, forces exclusive sequential access to content. The content may be checked out, modified, and then checked back into some repository. This means that multiple participants may be blocked from making changes to the content. This can significantly increase the time required for each participant to make his or her changes. This is because participants may need to be notified of available unlocked content or keep checking to see if the content is unlocked.

SUMMARY OF THE INVENTION

In general, the present invention is directed to a system and method for content collaboration among participants connected to a network. Preferably, an electronic medium has at least one dynamic content region that includes dynamic content and is stored in a server. The electronic medium is served to at least one of the participants in response to an open action of an electronic message by the at least one participant. The dynamic content may include binary or textual content. The dynamic content region may be asynchronously dynamically updated and retrieved in response to the open action. In this way, the dynamic content in the electronic medium is current when read or accessed by any of the participants and reflects the then current content of the group content collaboration.

Accordingly, in one aspect, the present invention is directed to a system for content collaboration among a group of participants that includes a server having an associated database and adapted to be used in a network. The server generates and sends an electronic message to the participants, and the server generates and sends an electronic medium stored in the database to at least one participant in response to a first open action of the electronic message by the least one participant. An interface in the electronic medium may be used to communicate input from the participants. At least one dynamic content region having dynamic content associated with the content collaboration may be included in the electronic medium, and logic in communication with the database may asynchronously dynamically update and dynamically retrieve the dynamic content associated with the content collaboration that is stored in the database.

Implementations of the invention may include one or more of the following. The binary content may include images, streaming media, a virtual white board, or a group greeting card. An external source in data communication with the server may be used to deliver content to the dynamic content region. The network system may be adapted to support the Internet or an electronic mail protocol. The textual content may include a list, word processing document, a table, a form, an outline, a calendar, or a slide presentation.

In another aspect, the present invention is directed to a content collaboration tool that includes a server having a database that is adapted to receive an electronic form. The electronic form may include network addresses associated with each participant in a group and details about a plurality of binary content. The server may generate and send an electronic message to each of the network addresses. An electronic medium may be stored in the database and sent to at least one participant in the group in response to a first open action by the least one participant. The electronic medium may be asynchronously dynamically updated and dynamically retrieved by the server. At least one dynamic content region may be included in the electronic medium that includes dynamic content. The dynamic content may be binary or textual content.

In a further aspect, the present invention is directed to a method for content collaboration among a group of participants that includes generating an electronic form having a plurality of network addresses associated with the participants and details about the content. The method also includes sending the electronic form to a server, and parsing an electronic message received by at least one of the participants from the server in response to an open action by the at least one participant. An electronic medium having at least one dynamic content region may be served in response to an open action by any of the participants. The electronic medium may be stored in a server, and may include a dynamic content region having a then current dynamic content. The dynamic content may include binary or textual content. The method may also include asynchronously dynamically updating and dynamically retrieving input from any of the participants about the content.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

FIG. 8 illustrates an example electronic form to initiate a group greeting card having binary content.

FIG. 10 illustrates an image of an interaction region of the zaplet of FIG. 9

FIG. 12 illustrates an example of an electronic form for initiating a task allocation.

FIG. 13 illustrates an example image of a zaplet for supporting task allocation among a group of participants.

FIG. 14 illustrates an example of an updated image of the zaplet of FIG. 13.

FIG. 15 is an example of an electronic form for initiating a stock tracker.

FIG. 16 illustrates an example image of a zaplet for supporting stock tracker among a group of participants.

FIG. 17 illustrates an example of an updated image of the zaplet of FIG. 16.

DESCRIPTION OF THE PREFERRED EMBODIMENTS

Figure 1:
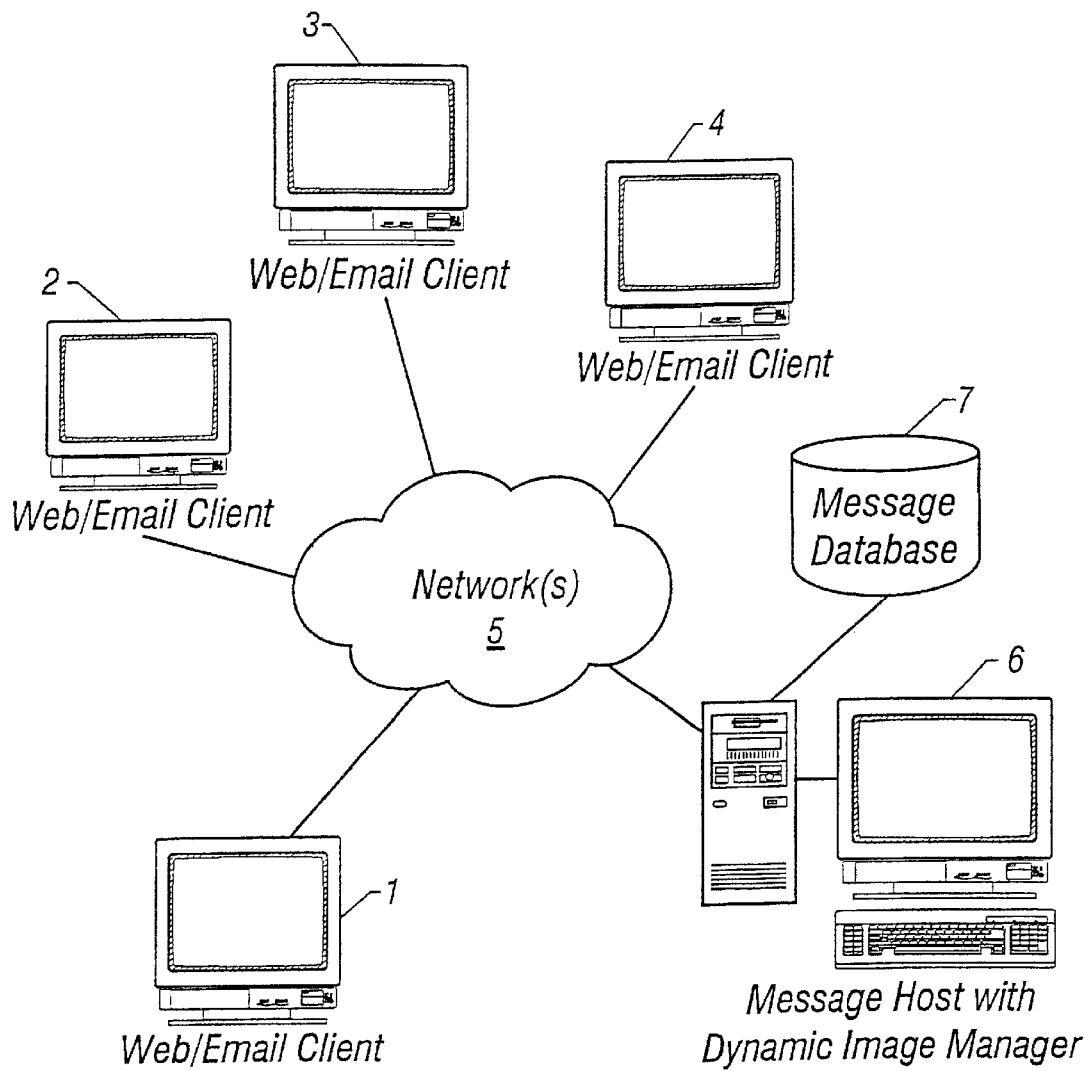
FIG. 1 is a simplified diagram of a sample network including participants of a group connected to the network.

In general, the present invention is directed to a method and system for communicating and collaborating among participants in a group. The method uses an electronic medium having at least one dynamic content region that is stored in a database of a server. Input composed by the participants of the group or other external sources is accepted by the server to update the dynamic content region of the electronic medium in the server. The updating of the dynamic content region is preferably performed asynchronously relative to the sending and receiving of the input from any of the participants or external sources. In this way, the content of the electronic medium is always current.

The invention is based on a principle different from known communication systems i.e. the information communicated between participants of the group is not current when sent by any participant, but current when accessed or read by a participant. The method and system of the invention does not merely rely on sending information that was current when the medium was sent to a receiving participant to communicate information; rather, the current content from the server of the electronic medium is retrieved, when the receiving participant accesses the electronic medium. This means that multiple virtual instances of the electronic medium can be reduced to a single thread. The method and system usefully reduces the amount of media, such as electronic mail messages carrying redundant static content that is communicated among the participants of the group. This invention also makes collaboration of information more rapid and interactive among participants of the group.

The electronic medium can also be updated by a variety of external sources, such as by an attached server containing stock quotes, sports scores, or news feeds. In this way, the electronic medium can be used to supply different types of information to the participant in a fast, efficient, and flexible manner.

A suitable system for the invention is a communication network that is configured with participants that support a variety of protocols, such as those for supporting electronic mail ("e-mail") and the Internet. The electronic media for communicating information and that supports collaboration among participants in a group connected to the network will be referred to as a "zaplet". The zaplet contains static content and dynamic content regions. The term dynamic content can be defined as regions of the zaplet that are retrieved from the server, when the zaplet is accessed by a participant or external source. The term static content can be defined as regions of the zaplet that are not retrieved at the time the zaplet is accessed by a participant or external source. The dynamic content of the zaplet can be changed and updated by the participants in the group or by other external sources, such as an external server containing the most recent news feeds or stock quotes. The content of the zaplet can be stored in a database in a server of the network. The zaplet is also customizable and programmable, containing various text and graphical regions to execute a variety of functions and applications. Preferably, each of the regions may be configured by the participants or the server in the network. When a participant performs an open action to access the zaplet, the zaplet may open and the server serves and displays the then current content in the database to a participant.

An "open action" can be defined as an action by any of the participants or the server that causes the static and/or the dynamic content of the zaplet to be retrieved from the server. For example, an open action may occur when a user invokes the File Open command from a menu bar within an email reading program while an email message containing a zaplet is selected. Alternatively, the server could perform an open action using, for example, push technology processes.

The term collaboration can be defined as an activity in which one or more participants or services share information or points-of-view with an intent of reaching a decision, making a choice, conducting a financial transaction, or sharing knowledge.

The dynamic content can be represented in a dynamic content region in the zaplet, and includes text or images, such as rich text HTML, based on mark-up languages or image construction languages. Consequently, the zaplet can supply all the look and feel possibilities of the World Wide Web ("Web"), and also the participants can experience interactions and collaborate with each other with increased efficiently than in known e-mail systems.

The system and method of the invention makes communication among a group of participants simple. Preferably, the server used to generate and manage the zaplet is scalable for a particular implementation. Its scalability allows quick user response under heavy load conditions on the server. Further, the zaplet can be easily accessed by the participant, such as from a desktop computer. Accordingly, the participant will have constant access to his or her zaplet at all times, and thereby can collaborate with other participants in the group quickly, simply, and efficiently. This means that the participant needs not repeatedly type-in the universal resource locator ("URL") of a portal web site to regain access to a particular application, such as a discussion; the zaplet may be easily accessible and open in an unobtrusive manner.

Unless otherwise defined, all technical and scientific terms used herein have substantially the same meaning as commonly understood by one of ordinary skill in the art to which the invention belongs. Although many methods and systems similar or equivalent to those described herein can be used in the practice of the present invention, suitable methods and systems are described below. Additionally, the methods, systems, and examples described herein are illustrative only and not intended to be limiting.

Other features and advantages of the invention will be apparent from the following detailed description, the drawings, and from the claims.

FIG. 1 illustrates a plurality of participants 1, 2, 3, and 4 of a group that are coupled to a network 5. Any number of participants may be connected to the network 5. The term participant can be defined as an entity or system that is capable of performing or executing a variety of functions on the zaplet as described herein. For simplicity, however, the following description will be made to participants 1–4. Each of the participants 1–4 may include any specific or general computer system that is equipped to receive or read e-mail messages using standard e-mail protocols, such as the Simple Mail Transfer Protocol (SMTP) and the Multipurpose Internet Mail Extensions (MIME), or navigate the Web. The computer may be, for example, a personal computer ("P.C."), an Apple Macintosh, a Unix workstation, or other computing machine that runs a windows-based operating system. A suitable computer may also include a modem, a monitor, a keyboard, a mouse, system software including support for TCP/IP communication, and browser software. Alternatively, the participants 1–4 may include other devices that are capable of transmitting or receiving e-mail messages, forms, or zaplets, such as Palm computers provided by 3Com Corporation, Windows CE-based devices, messaging enabled cellular telephones, pagers, television set top boxes, e.g., Web T.V., or portable computers. The participants 1–4 may further include other devices that are capable of processing text or voice messaging.

The network 5 may be any local or global computer network. For example, the network 5 may be the Internet, a telephone network, a wireless communications network, a satellite communications network, or other similar data networks.

For simplicity, the following description will be made using a system and method configured to support any of the below listed e-mail protocols and data structures. However, the invention can be configured and practiced in any of the above communication networks. For example, voicemail using interactive voice systems could be configured to provide voice messages as current when heard dynamic content.

Each of the participants 1–4 is configured to support a variety of e-mail protocols and mark-up languages, such as SMTP, MIME, Hypertext Mark-up Language ("HTML"), Extensible Mark-up Language ("XML"), Standardized Generalized Mark-up Language ("SGML"), or similar e-mail protocols and/or mark-up languages.

FIG. 1 also shows a server 6 that is connected to the network 5. The server 6 is preferably configured to manage the dynamic content, routing, and updating of electronic forms, messages, or zaplets among the participants 1–4. The server 6 is connected to a message database 7 that is used to manage the dynamic content of zaplets in accordance with the present invention. Other data management resources may also be used.

Figure 2:
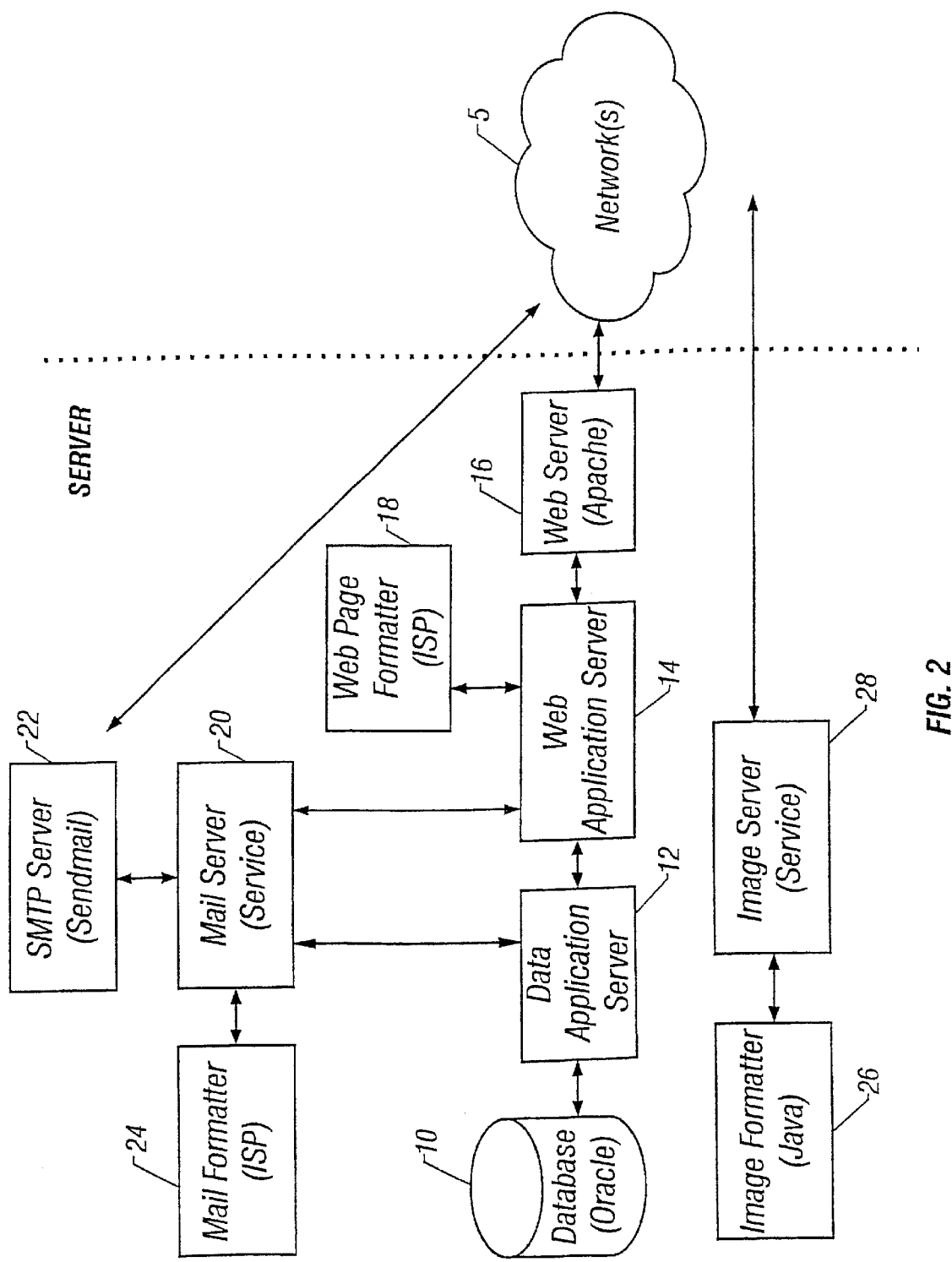
FIG. 2 illustrates a schematic diagram showing data flows of functional components of the network of FIG. 1.

FIG. 2 illustrates a simplified block diagram showing data flows of various functional components of the server 6. The server 6 includes a database 10. The database 10 may be a relational database, such as commercially available from Oracle. The database 10 may include multiple physical databases and may be implemented at a single site or distributed among many sites. The database 10 may also be implemented using object-oriented databases, object-relational databases, or hierarchical file structures.

The database 10 may include information that is specific to any participant or electronic form, message, or zaplet. Contents of the database 10 may include demographic data, participant credit card and payment information, participant preference information, generic form, message, or zaplet information, such as recipients or senders of the group, subject identifiers, or message specific information, and usage statistics for the electronic forms, messages, and zaplets and/or a web site. The database 10 may also store electronic forms that act as blanks for the creation of the zaplets. The database 10 may also include images and web pages used in the creation of the zaplets and also used in the presentation of any dynamic region of the zaplet. The database 10 may also maintain a record of the history of changes that have been made to any dynamic content region of the zaplet discussed below. This record may also be propagated along with any dynamic content to one of the participants parsing the electronic message and zaplet, as discussed below. An example configuration for storing and processing various content in the database 10 is illustrated in the attached Appendix A, which is herein incorporated by reference.

FIG. 2 also shows a data application server 12 is coupled to the database 10. The server 12 is configured with, for example, a set of Java classes or any other high level programming language built using, for example, an Enhydra application server or any of a variety of other tools for object-relational translation. The data application server 12 is used for translating the content in the database 10 into Java objects, for use by a web application server 14. The data application server 12 may also be configured to cache some data to reduce the load on the database 10.

A web server 16 is included in the server 6 to connect to the participants 1–4. The web server 16 is connected to the web application server 14 and can be any commercially available web server, such as an Apache server. The web server 16 is configured to manage requests from browsers at the participants 1–4, to manage session information, to send and receive forms, or zaplets transmitted to or from the participants 1–4, and to serve HTML data and static images to the participants 1–4.

The web application server 14 can be configured using a set of Java classes built-on top of the data application server 12. The web application server 14 is responsible for executing business logic associated with the electronic forms, messages, and zaplets. For example, the web application server 14 may manage message, form, and zaplet manipulation, deadlocks in the network 5, generate a URL and content associated with a specific zaplet or form, format the zaplet, message, or form, handle message authorizing, and handle participant record editing and participant interaction with various zaplets, forms, and messages.

A web page formatter 18 is connected to the web application server 14. The web page formatter 18 is used to handle the basic styles and layouts of various components of the zaplets, messages, or forms. Further details of the preferred business logic configured in pseudocode executable by the system and describing the method of the present invention for initiating, sending, updating and displaying the zaplet, forms, and messages can be found in attached Appendix A.

The web page formatter 18 may be configured to operate using a Java Server Page ("JSP") construct.

FIG. 2 also shows that the server 6 includes a mail server 20 coupled to the web application server 14 and the data application server 12. The mail server 20 handles the operations of the e-mail protocol necessary to support a variety of zaplets, forms, and messages. For a given message, form, or zaplet, the mail server 20 retrieves data associated with the medium from the data application server 12, and from any operations of the business logic of the web application server 14. The mail server 20 then formats the static content for the medium utilizing an associated mail formatter 24 including a command to retrieve the dynamic content. The mail formatter 24 includes operations that can be used for the basic styles and layouts of the common elements of the zaplets, forms, or messages. Once the mail server 20 has compiled the required information from the data application server 12 and web application server 14, the mail server 20 may attach necessary header information to the zaplet, form, or message. For example, the header information may make an e-mail message compliant with the MIME standard. The mail server 20 then transmits the produced message to a mail transport server 22. The mail transport server 22 routes the message through the network 5. The mail server 20 may also be configured to manage bounced and undelivered messages, forms, or zaplets, and also alert the appropriate participants of these conditions. The mail server 20 may also communicate with the web application server to validate the addresses of the various participants. The mail server 20 may also receive responses via the interaction region 225 discussed below from any participant who is not connected to the network 10 or "off-line" when reading the zaplet. In this configuration, the participant can send input back to the server 6 to be dynamically updated, after he or she is re-connected to the network 10. In this way, the participant can contribute to a zaplet even in the absence of the dynamic content and without having to get back to the zaplet when connected "on-line".

The mail formatter 24 may be implemented using a JSP construct.

The mail transport server 22 may use SMTP, and can be implemented using a number of commercially available or open source e-mail servers, including Sendmail and the Exchange server.

The server 6 also includes an image server 28 that is used for connection to the participants 1–4. An image formatter 26 is connected to the image server 28. The image server 28 may be implemented using a web server (servlet). The image server 28 takes information from Hypertext Transfer Protocol ("HTTP") requests from the participants 1–4. and translates the information using predefined schemes into human viewable images that are encoded in a format compatible with known web browsers. The image server 28 may be configured separately from the web server 16, as shown in FIG. 2. This configuration may increase the scalability of the server 6. Alternatively, the web server 16 and the image server 28 can be configured together. The image formatter 28 may be configured using a Java construct. The image formatter 28 formats the image into a compliant standard, such as Graphical Interchange Format ("GIF"), Joint Photographics Experts Group ("JPEG"), or Portable Network Graphics ("PNG"), for the participants 1–4.

Figure 3:
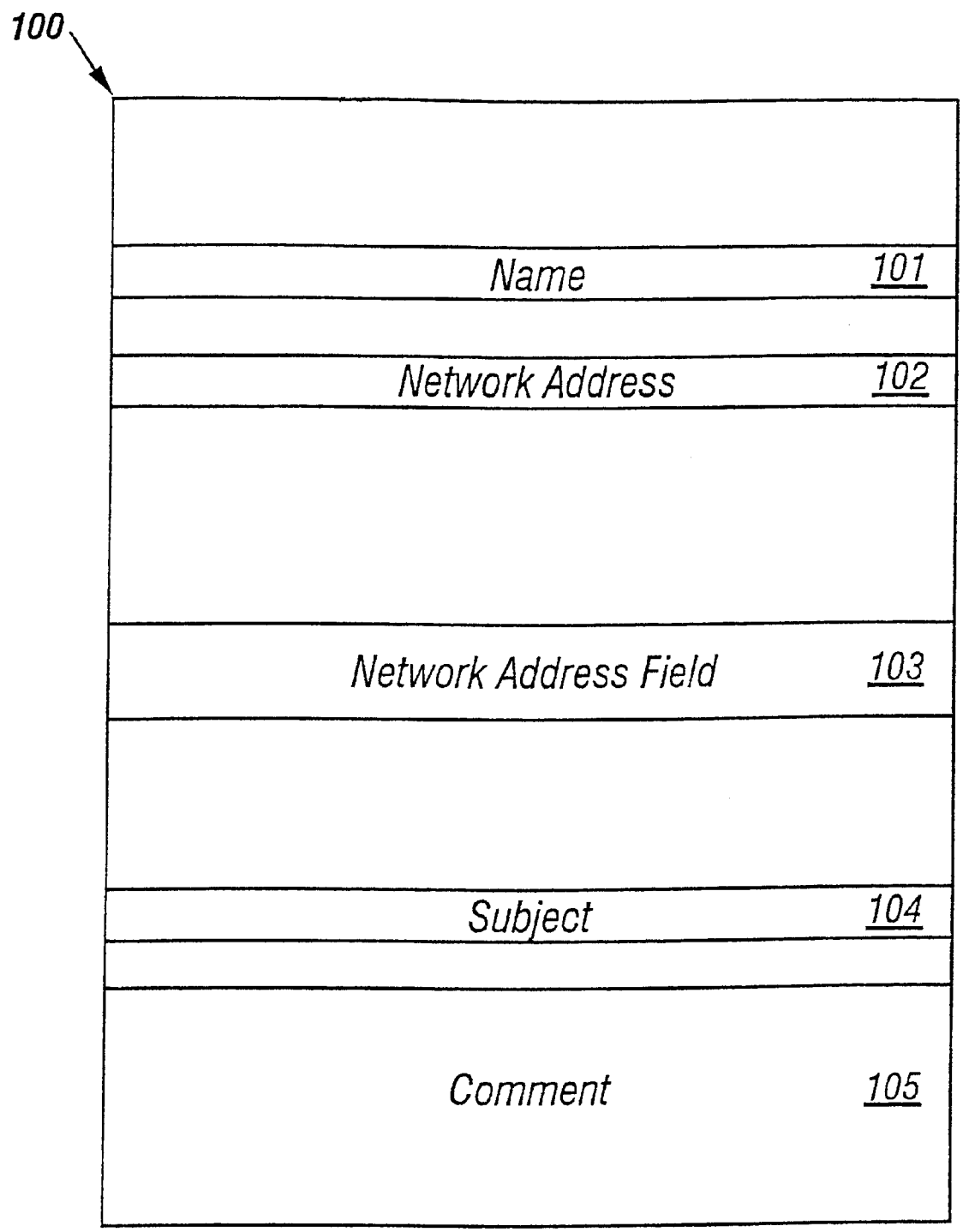
FIG. 3 illustrates an example electronic form to initiate a zaplet.

FIG. 3 illustrates an exemplary electronic form 100 that can be used to compose and initiate a zaplet among the participants 1–4 in accordance with the invention. The electronic form may be, for example, an HTML form. The electronic form 100 can be accessed via a web site sent by the server 6 to the participants 1–4, or may reside as a template at the participants 1–4.

The electronic form 100 can be stored in database 10, reside on a device of a participant, such as in a memory of a computer, or can be sent to a participant via a communications protocol, such as e-mail. The electronic form 100 may be blank or partially completed. To partially complete the form, the server 6 may contain prior knowledge of the use of the form using, for example, "cookies" or other suitable techniques.

The electronic form 100 includes a name field 101 that specifies the creating participant's name and a network address field 102 that specifies a specific address associated with the creating participant, such as an e-mail address. The electronic form 100 can also include a network address field 103 that includes network addresses of the participants that should receive the zaplet. The list of network addresses in the field 103 may include the network address of the creating participant. The list of network addresses may be explicitly inputted by the creating participant using a keyboard, imported from a folder or other file residing at the creating participant, or imported by the creating participant from a peripheral device, such as a Palm Pilot provided by 3Com. Alternatively, the creating participant can provide the list of network addresses to the server 6. In this configuration, the server 6 may input the list of network addresses into the field 103, when the creating participant accesses the electronic form 100, as described below. This means that the field 103 will be completed for the creating participant, when the electronic form 100 is accessed. At this stage, the creating participant may add or delete network addresses from the list provided by the server 6.

The electronic form 100 may also include a subject field 104 and any number of question, choice or comment fields 105. The creating participant may describe the subject matter of the zaplet in the subject filed 104 and supply details regarding the zaplet, in the comment field 105. In one configuration, each of the fields 101, 102, 103, 104, and 105 are part of a static region. The electronic form 100 may also include other applicable fields, such as for a title of the zaplet, fields for soliciting information from the participant, such as his/her address, links to other zaplets, a description field to receive an input, such as a URL, an image or binary data field, or option fields to specify choices, such as a poll choice.

The electronic form 100 can be used to initiate a variety of zaplets for different applications, which are herein referred to as "zaplet processes". Once the electronic form 100 is created, it is sent to the server 6. The server 6 then sends an e-mail message to the participants listed in the network address field 103 to notify the receiving participants that a zaplet process has been initiated. The e-mail message is opened and parsed, and the zaplet is essentially immediately accessed from the server 6 as described below.

Figure 4:
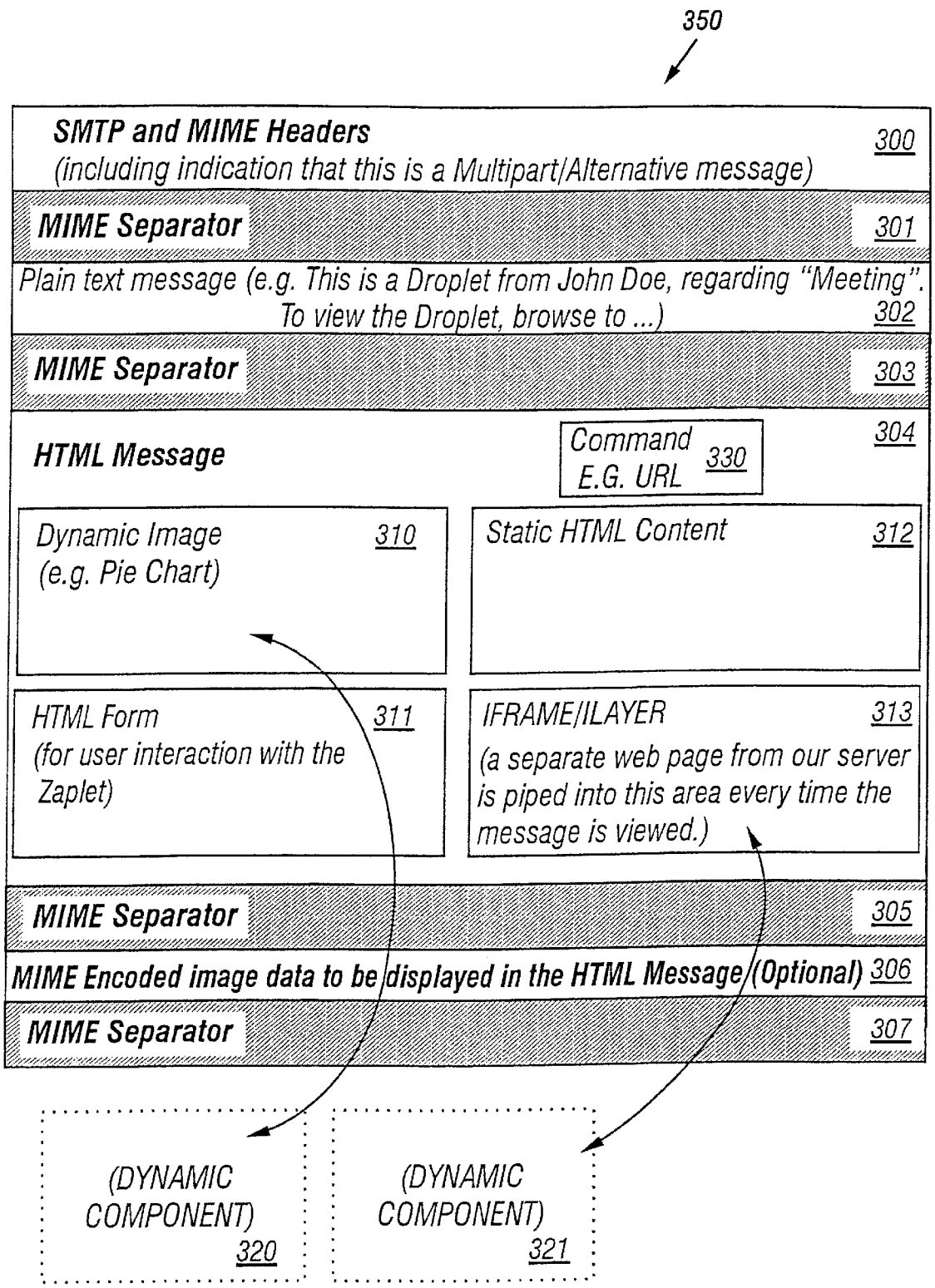
FIG. 4 is a diagram of a data structure for the zaplet having dynamic content.

FIG. 4 shows a suitable data structure for a zaplet process in accordance with the invention.

The data structure 350 can be based, for example, on HTML over SMTP using MIME. The data structure 200 includes SMTP and MIME headers 300. These headers 300 include an indication that the message is a multipart/alternative type according to the MIME standard. The multipart/alternative type specifies that the participant is configured to display one alternative format or content-type of the message selected from a segment 302 and a segment 304, depending on the capability of the software of the participant parsing the message.

The data structure 350 may define a transport envelope with region 300 containing a plurality of network addresses, such as the e-mail address of a sending and receiving participant.

A MIME separator 301 may be inserted between headers 300 and segments 302 and also between segments 302 and 304.

The segment 302 may also include a plain text message that is displayed if the participant does not have the capability to display regions 310 and 313 of segment 304, described below, according to the multipart/alternative message type indicated in the headers 300. For example, the segment 302 can include a command instructing a participant that he or she may view a web page corresponding to the segment 304.

The segment 304 may include a rich text HTML document, including any number of dynamic regions 310, HTML forms 311, static HTML content regions 312, and IFRAME/ILAYER regions 313. The dynamic content region 310 can include a command to dynamic content 320 of the zaplet, stored remotely such as in the database 10 of the server 6 on the network 5. The IFRAME/ILAYER region 313 may include a command to access dynamic content 321 of the zaplet, stored remotely such as in the database 10 or at the server 6 on the network 5. The dynamic content 321 may be in the same location as the first dynamic content 320, or may be in a different location in database 10. Each dynamic content region 310 and 313 may have content that includes more than one dynamically updated construct or image.

The form 311 can be used to receive input from a participant, and the region 312 can be used to provide static information/processes that are independent of the current zaplet process.

The segment 304 may also include a region 330 that can be used to store a command indicating a web page storing the content of the segment 304. This configuration can be used when a participant attempts to forward the zaplet to another participant connected to a server that cannot support the segment 304. In this way, the participant can still view the content of segment 304, and is therefore not dropped from the group.

In FIG. 4, a M separator 305 is configured between the segment 304 and a segment 306.

The segment 306 can include MIME encoded image data to be displayed in the HTML message of segment 304. The image data may include images for logos or photos that can be accessed by the participant even if the server 6 is not accessible. The optional segment 306 is followed by a MIME separator 307.

The present inventors have discovered that the structure 350 can be used to provide a high quality of service to various classes of participants based upon their e-mail client application capabilities. Five classes of "e-mail clients" include new P.C. e-mail clients, web e-mail clients, older P.C. e-mail clients, text e-mail clients, and America On-Line ("AOL") e-mail clients. The functionality in the segment 304 is provided to new P.C. e-mail clients completely. Some web e-mail clients do not allow use of an IFRAME/ILAYER tag to display dynamic content 321 of the dynamic content region 313. In this case, the participant gets a static message directing the participant to a web representation, or a dynamic image displaying the same up-to-date data is served by the image server 28. Many older P.C. e-mail clients, and all of the text e-mail clients cannot display the segment 304. These participants may receive an e-mail message with static content, and a URL identifying a web page at which the dynamic content may be accessed. Current AOL clients support some of the HTML standard.

It has also been found that the server 6 can be configured to identify the capability of a participant. For example, the server 6 can be configured to automatically send the zaplet to the participant by recognizing the suffix "aol.com" in the participant's network address. Alternatively, the participant can specify which e-mail client to use by sending a request to the server 6.

Figure 5:
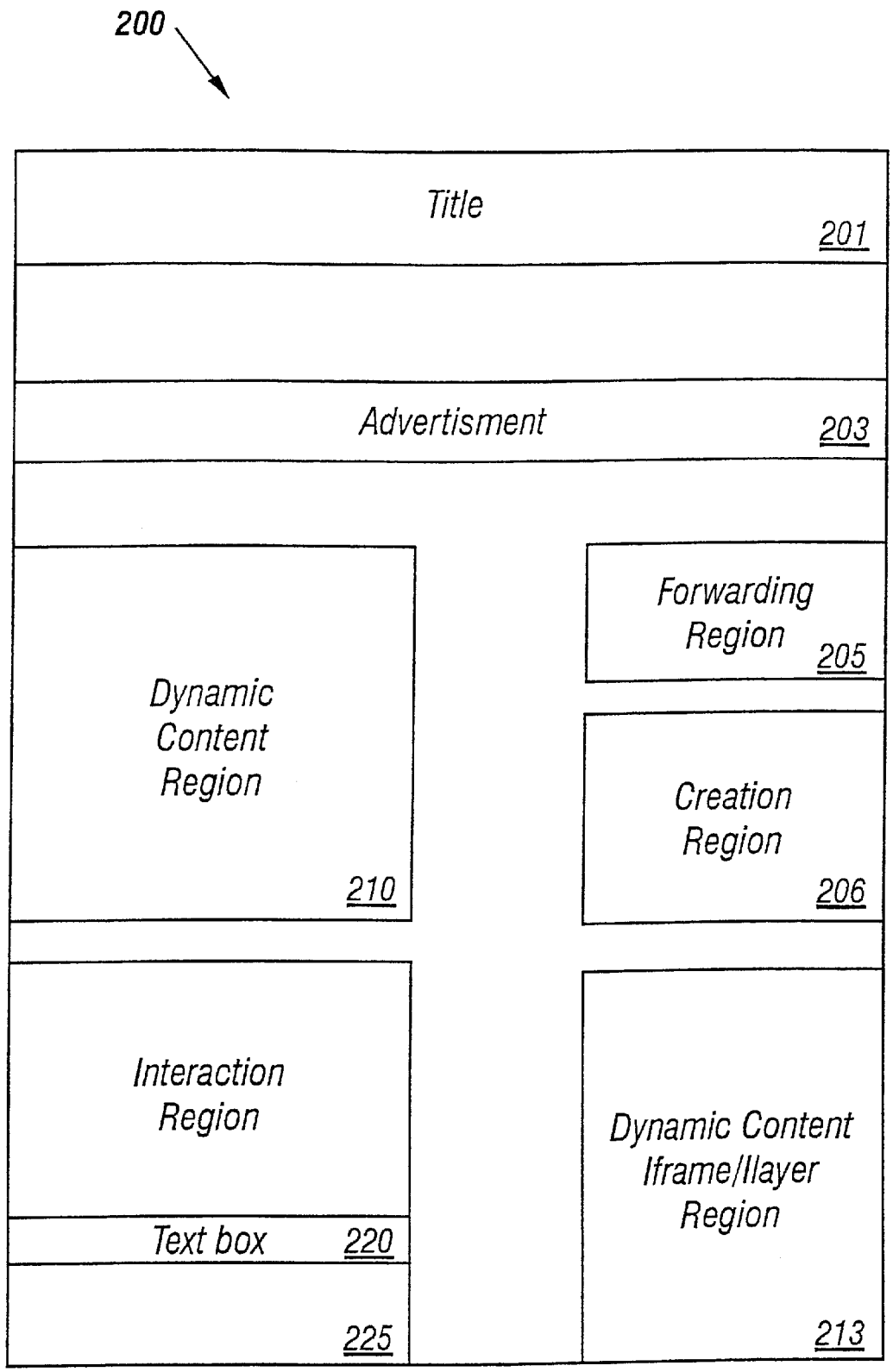
FIG. 5 is an example of an image of a zaplet.

FIG. 5 shows an example of an image of a zaplet 200 that is displayed to a user when the data structure 350 is parsed. The zaplet may include a title field 201 that contains static content similar to the information inputted in fields 101, 102, 104, and 105. Preferably, the above static content is displayed each time the zaplet 200 is accessed by a participant. The zaplet 200 may also include an advertising region 203. The content in region 203 can be static or dynamic content. The content in regions 201 and 203 can be configured and supplied by the business logic in web application server 14.

The zaplet 200, also includes a forwarding region 205 and a creation region 206 corresponding to segment 312 of the data structure 350. The region 205 allows a participant to add an address of a potential participant that is not listed in the address field 103. This means that any participant listed in the address list of field 103 can include any other potential participants not listed in the field 103. In other configurations, the ability of a participant to add another participant can be controlled by the creating participant of the zaplet.

The creation region 206 is also included in zaplet 200 to allow a participant to create an electronic form similar to electronic form 100 to initiate another zaplet process.

The zaplet 200 also includes a dynamic content region 210 corresponding to segment 310 of data structure 350 that receives the dynamic content 320. In one configuration, region 210 may include a graphical image, such as a pie chart, or other binary content including executable content. The content 320 of the region 210 can be dynamically updated by the business logic residing in the web application server 14.

The zaplet 200 also includes an interaction region 225 corresponding to segment 312 of the data structure 350. The interaction region can include images, such as check boxes, to select options created using the electronic form 100. For example, a poll can be initiated in electronic form 100 and the interaction region 225 could contain boxes to select a poll choice. The interaction region also contains a text box 223 that allows a participant to add a text passage to the zaplet. The interaction region may also include the name of the responding participant and his or her associated e-mail address.

A dynamic content region 213 corresponding to region 313 of data structure 350 is contained in zaplet 200 that receives the content 321. The content 321 can include text passages that are entered by participants using the interaction region 225. The business logic at the web application server 14 manages the text passages and causes changes to the variables in database 10 to update the content 321 and to display the updated content in region 213, when the participant opens the message. The displayed content in region 213 may include visual images, a list of participants who have entered text passages, or any other relevant dynamic content.

Figure 6:
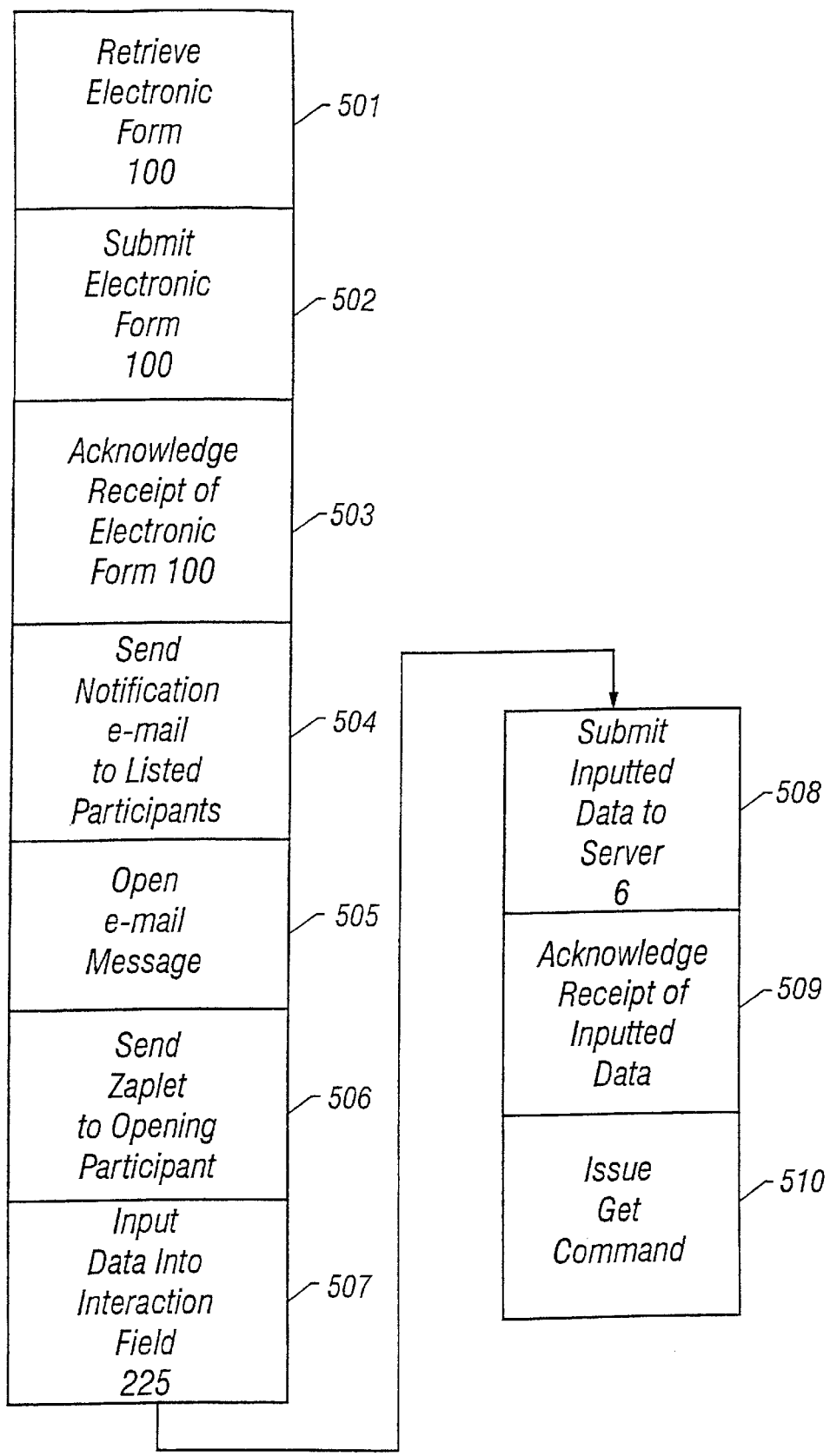
FIG. 6 is a flow chart illustrating a preferred method of the present invention.

FIG. 6 is a flow chart of a preferred method of the invention. Initially, one of the participants accesses a live electronic form 100 to begin a zaplet process (step 501). The requesting participant may access the form 100 from the database 10 via the web server 16, from a web site, or other resource as discussed above. To access the electronic form 100, the participant may specify a descriptor, such as a URL, associated with the electronic form 100. Once the electronic form 100 is displayed to the participant, the participant completes the fields 101, 102, 103, and 104. The participant may also complete field 105. The participant then submits the form to the server 6 (step 502).

Next, a confirmation message is sent from the web server 16 indicating that the content of the electronic form 100 was received, that the electronic form 100 was sent to the addresses listed in field 103, and any other errors associated with the processing of the electronic form 100 (step 503). Alternatively, the creating participant of the electronic form 100 may receive the e-mail message (step 504) described below as an acknowledgement that the form 100 was successfully received by the server 6.

Each of the participants in the list in field 103 receives an e-mail message associated with the zaplet (step 504) indicating that the zaplet process has been initiated. Next, a receiving participant opens the message (step 505). In one configuration, a receiving participant may be the creating participant. This mechanism could allow a creating participant to create a "personal" zaplet that only he or she could update or retrieve. Once the receiving participant opens the e-mail message, the dynamic content of the zaplet 200 is served essentially at viewing time to the display of the participant as follows (step 506).

Figure 7:
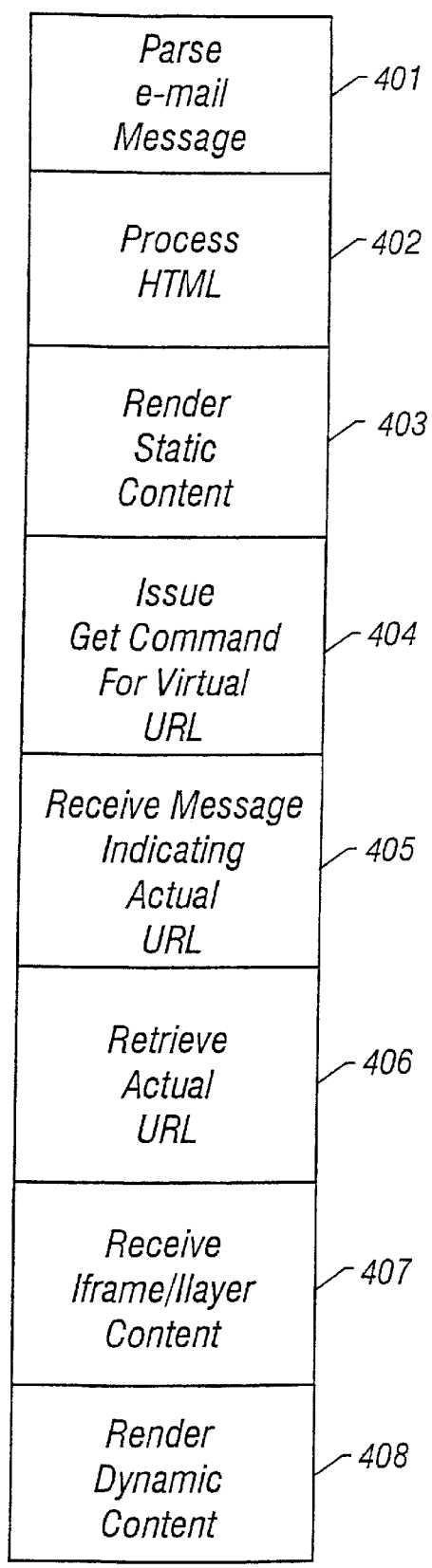
FIG. 7 is a flow chart illustrating a preferred method of accessing the zaplet by parsing the data structure of FIG. 4.

Referring to FIG. 7, the e-mail protocol residing at the participant begins by parsing the received e-mail according to the MIME and SMTP header and separators 300 (step 401). If the participant is capable of displaying the dynamic content of the zaplet in the segment 304, content is produced by parsing the HTML (step 402). The participant initially renders static components of the zaplet, such as in the regions 311 and 312 (step 403). To render the dynamic content in region 310, a parsing engine at the participant issues a get command using, for example, a virtual URL identified by a tag field in the HTML (step 404). The server 6 includes logic, such as business logic in web application server 14, to map the virtual URL to an actual URL for the dynamic content 320 of the dynamic content region 310, and returns a message indicating the actual URL for the dynamic content 320 corresponding to the virtual URL, which is received at the participant site (step 405). A get command for the actual URL is then issued (step 406). A web page indicated by the IFRAME/ILAYER region 313 of the data structure 350 can also be retrieved similar to steps 404–406 (step 407), and then the dynamic content 321 for the dynamic content region 313 is rendered (step 408).

Referring again to FIG. 6, once the zaplet 200 is retrieved by the participant, he or she inputs data into the interaction region 225 (step 507). For example, the user may input a text passage. At this stage, the dynamic content region 213 will include concatenated text messages and a list of message recipients as discussed above. The participant then submits the updated zaplet to the server 6 (step 508). Next, the submitting participant receives an acknowledgement from the web server 16 indicating that the zaplet was received (step 509). The e-mail protocol residing at the client may then issue at any time a new get command for the dynamic content in region 310 and/or region 313 to display the updated images and/or text content in the dynamic content regions 210 and 213 (step 510). Alternatively, after the participant submits his or her input (step 508), another instance of the zaplet could be served that includes the above acknowledgement, and also reflects the most recent dynamic content including the submission at step 508. In another configuration, the dynamic content of the zaplet could be updated "in-place". This means that the regions 210 and 213 could be updated to reflect the most recent content in the server 6 including the submission at step 508, as the participant is viewing the zaplet. Subsequent actions by any of the participants of the group to open a message will result in the display of the updated images and text content in the zaplet 200.

The preferred method permits participants to collaborate efficiently. Each participant can send and receive information that is current using dynamic regions 210 and 213. This means that participants can accurately respond or opine to a zaplet process with the most current information at their disposal.

The preferred method supports privacy and communications because the dynamic content can be restricted to those specified in field 103. Further, the preferred method and system allows content to be dynamically updated asynchronously relative to the sending of the documents or forms and asynchronously relative to any processes used by any other participants parsing the electronic messages. In this way, the zaplets received by participants of the group do not become stale or outdated. Additionally, the updated content includes dynamic information identifying changes that have occurred since the message was last viewed by the viewing participant. This means that the viewing participant can track the opinions, suggestions, or other comments made by other participants in a simple and quick manner. The preferred method also allows participants to interact with other participants in a group without the daunting task of "surfing" the Web to find the discussion management tool that manages the discussion. The preferred method and system also provides the highest quality service based upon the participant's e-mail application capabilities.

The above preferred methods and systems can be used to support content collaboration among a group of participants. The content may be binary. Binary content may include images, streaming media, e.g., video and audio, virtual white boards, and group greeting cards. The content may also be textual. Textual content may include letters, numbers, and words. Other examples of textual content include lists, spreadsheets, word processing documents, outlines, forms, calendars, and slide presentations. The preferred methods and systems can support streaming media in which video and audio from a participant can be prefixed, inserted, appended, mixed, or overlaid with the streaming media object around which a group of participants is collaborating. Further, existing material in the streaming media object can be modified or deleted, and annotation of text or voice on the object may be possible. The preferred systems and methods can also support fixed media in which a participant can add imagery, symbols, or graphic objects to the fixed media object, such as an image, a virtual white board, or group greeting card, around which a group of participants is collaborating. For textual content, a group of participants may cooperate in the evolution of a collection of text. This may include non-destructive text entry/annotation or group text modification. Other text formats include a formatted or unformatted text document or list (e.g., bridal registry, gift wish list). A spreadsheet or other similar table format may be included as textual content. Finally, the preferred systems and methods may support group content collaboration using a dynamic agent or server. In this case, participants of a group may share the use of shopping agents, stock monitor agents, search engines, or news feed services.

One benefit to the preferred content collaboration tool is that the zaplet can help reduce conflicts between multiple participants attempting to modify or change the same content in the zaplet. This is accomplished by allowing the content to be current when read or accessed by any of the participants. This means that the participant can see the most current changes to the content before committing his or her input. Additionally, the number of potential conflicts is reduced because changes are made to the most current state of the content. This means that changes will not be made to old or stale content.

Another benefit to the preferred content collaboration tool is that the zaplet can provide conflict resolution services between multiple participants attempting to modify or change the same content in the zaplet. Further, the business logic may be configured to track the changes and modifications in the content. Thus, the server 6 can operate as an engine that is able to notice when a participant's change may conflict with other changes received at the server 6. In one configuration, the server 6 enables participants having a conflict to resolve those conflicts, by, for example, choosing between changes made by the conflicting participants. In another configuration, some of the conflicts can be resolved automatically. For example, the server 6 could be configured with a set of rules that control how the content can be changed. Advantageously, the conflict resolution services may be provided to any participant without requiring proprietary client software, as in known systems.

One example of group content collaboration is a group greeting card. A group greeting card can include binary content. The preferred methods and systems can supply a "canvas" onto which the different participants can add a piece to the overall binary content, such as an image. Further, the greeting card may include textual content that can be used to describe images or other binary content in the group greeting card. In other configurations, the group greeting card may include audio or video streams.

In one configuration, an initiating participant may initiate the group greeting card. The initiating participant may add the binary content to the zaplet by uploading content from an external source, such as a disk, by referencing other content on the Internet using, for example, a Universal Resource Locator ("URL"), or by picking content from a list of predefined options, or creating the content from scratch. Alternatively, the binary content may be automatically embedded in the zaplet by an external source in data communication with the server 6.

An example of a group greeting card process is as follows. Initially, one of the participants accesses a live electronic form 600 (FIG. 8) by executing the step 501. The initiating participant may access the form 600 similar to the form 100 described above. As shown in FIG. 8, the electronic form 600 may include fields 601, 602, and 603. The initiating participant's name may be inserted into the field 601, the network address of the initiating participant may be included in the field 602, and a list of participants to sign the greeting card may be entered in the field 603. The field 603 is similar to the field 103 described above. The electronic form 600 may also include a region 604 that can be used to specify the details of the group greeting card. For example, the region 604 may include options for the greeting type (e.g., birthday, holiday, sympathy, get well), greeting style (e.g., formal, casual, humor, personal), the type of image for the cover of the card, the title of the zaplet, the background information about the purpose of the card, the recipient of the group greeting card, and the network address of the recipient of the group greeting card. The region 604 may also include selections for predetermined or predefined greetings. A region 605 may be used to select the date and time on which to send the group greeting card to the recipient.

The electronic form 600 may also include a button 605 that allows the initiating participant to preview the card. At this stage, the card may include the details selected from the region 604. A button 606 may also be included in the electronic form 600 that enables the user to submit the form to the server 6 in the step 502. The steps 503, 504, 505, and 506 are then executed.

The e-mail protocol residing at the participant then executes steps 401–408.

Figure 9:
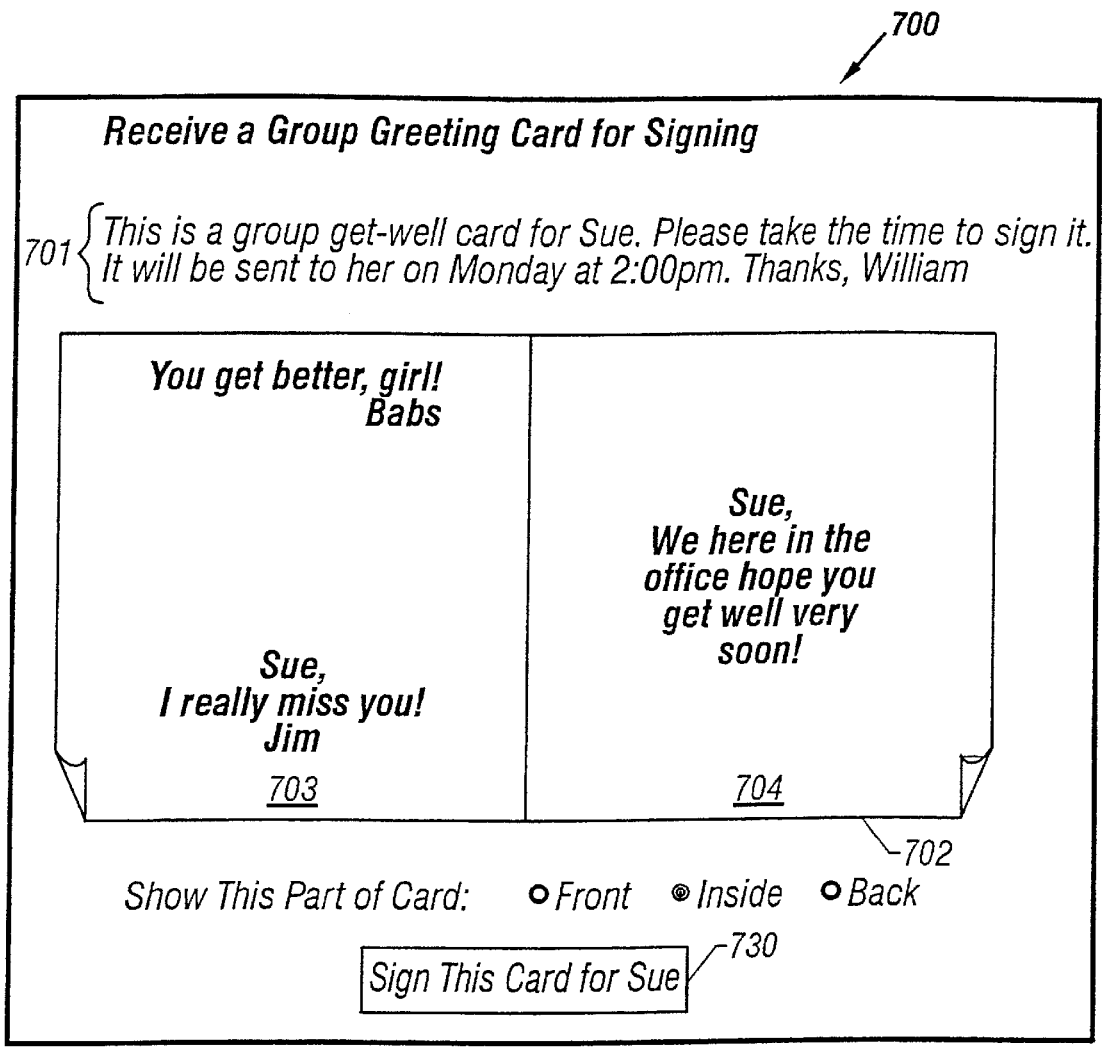
FIG. 9 illustrates an example image of a zaplet for supporting a group greeting card collaboration among a group of participants.

After step 408 is executed, a zaplet 700 is displayed to an accessing participant. As shown in FIG. 9, the zaplet 700 may include a banner 701 that includes information from the field 601 and the region 604. The banner 701 may also include other information relevant to the greeting card. The zaplet 700 also includes an image 702 of the greeting card.

The image 702 may include dynamic content regions 703 and 704. The dynamic content regions 703 and 704 may be used to display text or other binary content inputted by any of the participants via an interaction region 715 (FIG. 10). The interaction region 715 may be included in the zaplet 700 or may be included in another image displayed to the participants, as shown in FIG. 10. The interaction region may include fields 716, 717, 718, and 719. A participants name may be entered in the field 716, a network address of the participant may be entered in the field 717, and a comment may be entered in the field 718. The field 719 may be used to add a private message to the recipient of the group greeting card.

The interaction region 715 may also include a region 720. The region 720 may be used to control where a participant's greeting is placed on the group greeting card 702. The region 720 may include options, such as a page or the quadrant of the page at which to sign the card, the angle at which the signature should be written, the font, and the font color. The interaction region 715 may also include a button 705 and a button 706. The button 705 is similar to the button 605 described above. The button 706 may be used to submit the signature to the server 6.

In some configurations, the zaplet 700 may include a link or a button to access the interaction region 715. Accordingly, a participant wishing to sign the greeting card, may click on the button 730 to display the interaction region 715. Further, the zaplet 700 may also include viewing options that allow a participant to view the "front", the "inside", and the "back" of the greeting card 702.

Figure 11:
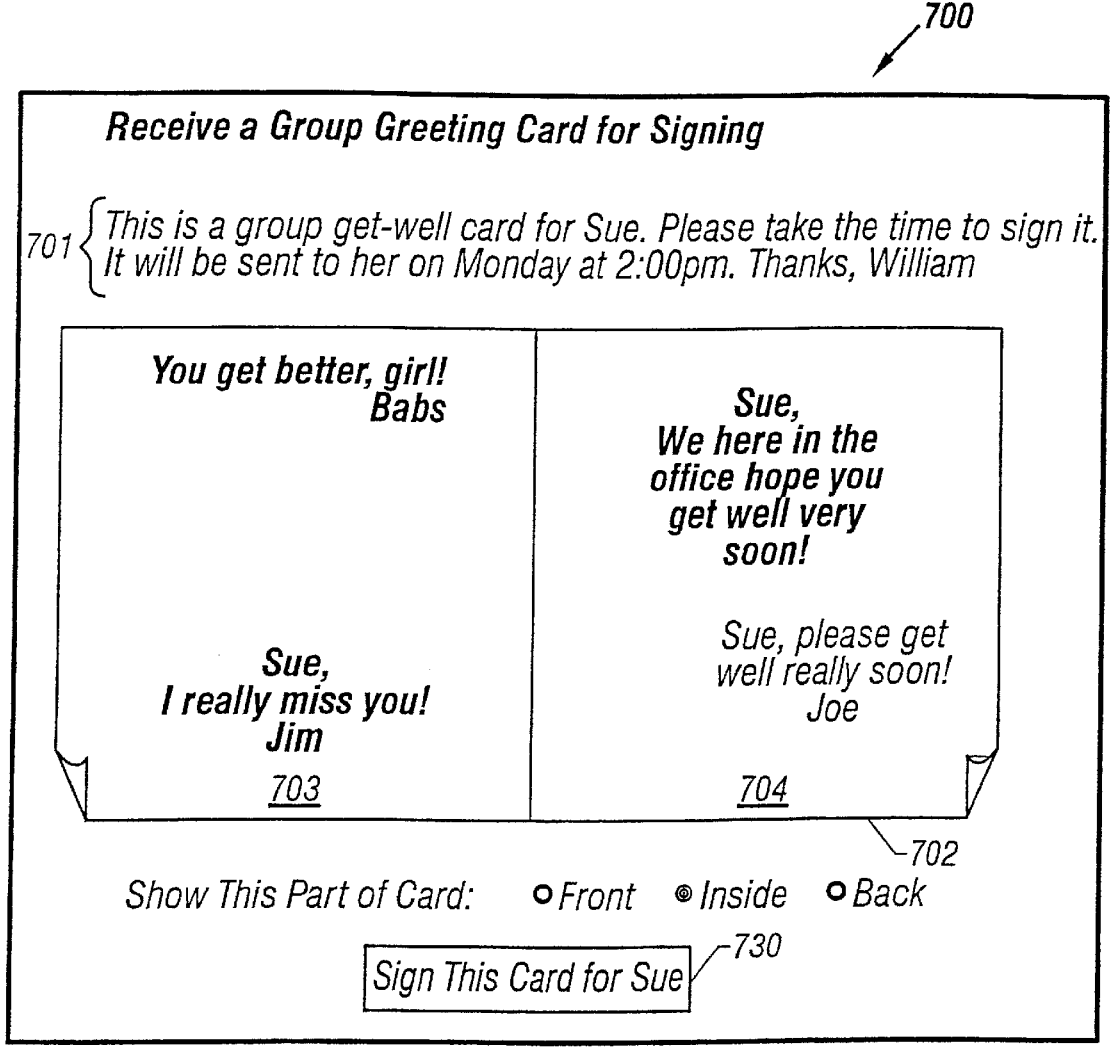
FIG. 11 illustrates an example of an updated image of the zaplet of FIG. 9.

FIG. 11 shows an updated image of the greeting card 702. As shown in FIG. 11, the input from the field 718 and the details of that input are displayed in the dynamic content region 704. In this example, the input is "Please get well very soon! Joe." Subsequent text input by the same or other participants of the group may be displayed in the same manner. In this way, a participant who accesses the zaplet, such as by clicking on the electronic mail message in his or her inbox is able to view an aggregated list of responses or signatures before responding or signing the greeting card. Further, a participant can also determine how his or her input will be spaced or shown on the greeting card 702 before the greeting card is sent to the recipient. Finally, the greeting card allows participants to create and annotate the greeting card in a variety of fonts, sizes, locations, and styles.

The server 6 may also be configured to handle conflicts between participants who may choose substantially the same location for the greeting on the card 702 using the input from the region 720. In one configuration, the server 6 may be configured to shape conflicting greetings as close to the specified location as possible using known techniques.

In another example, the zaplet may be used as a task assignment spreadsheet. In this case, the initiating participant may generate a list of tasks that need to be accomplished. Participants are asked to assign their names to rows in the list, to complete all cells in the row of the spreadsheet, or add new rows to the spreadsheet.

Figure 12:
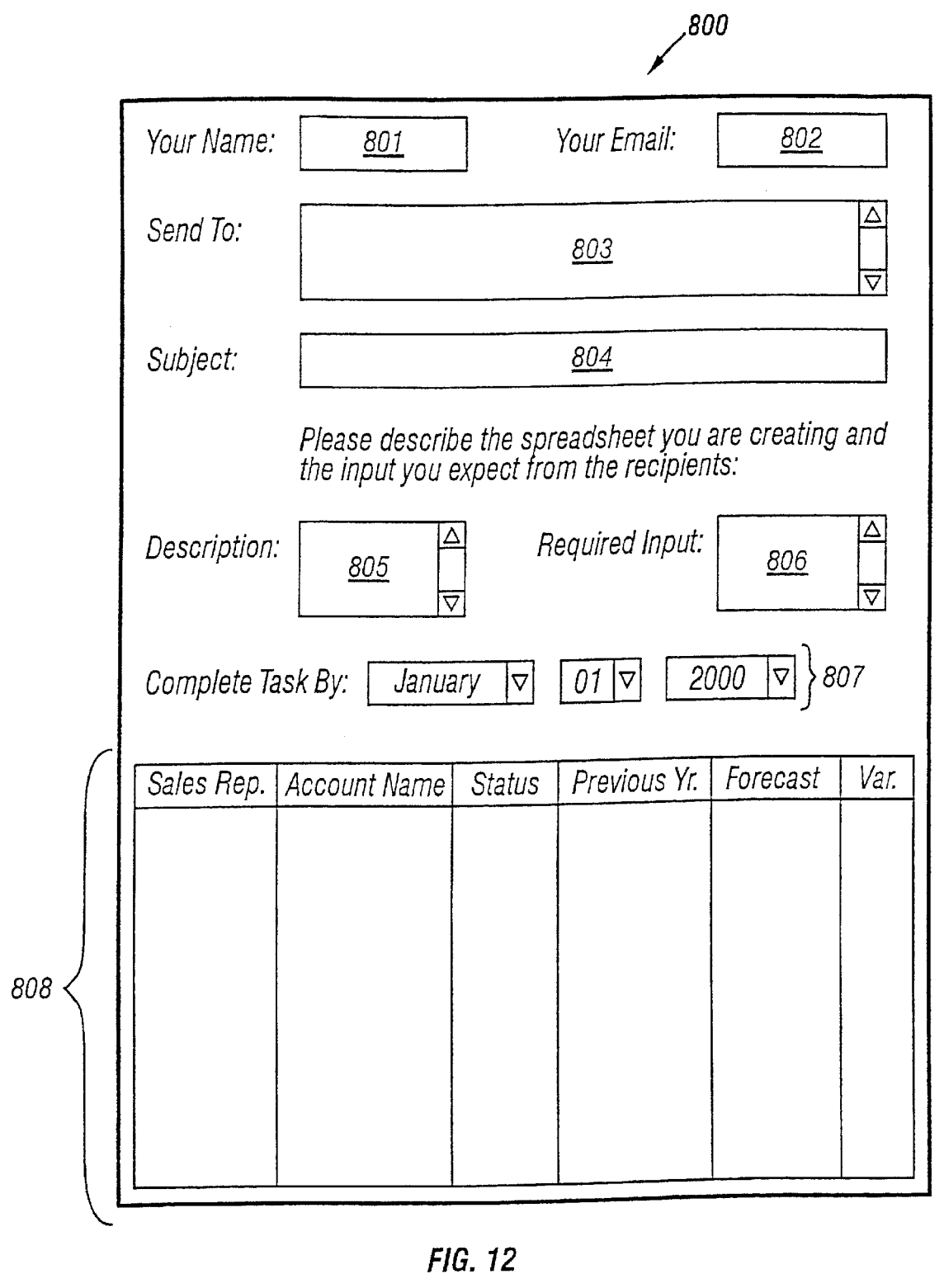

Initially, one of the participants accesses a live electronic form 800 (FIG. 12). The electronic form 800 may be accessed similar to the form 100 described above. As shown in FIG. 12, the electronic form 800 may include the fields 801, 802, and 803. The fields 801, 802, and 803 are similar to the fields 601, 602, and 603 described above. The electronic form 800 may also include a subject field 804 to specify a title of the spreadsheet, a field 805 to add further details about the spreadsheet, and a field 806 that contains specific instructions to participants about how to fill in the spreadsheet. A field 807 may be included that allows the initiating participant to specify a time and date on which the task should be completed. A region 808 may be used to specify the fields of the spreadsheet. Once the initiating participant has completed the electronic form 800, the form 800 may be submitted to the server 6 in the step 502. The steps 503, 504, 505, and 506 are then executed.

The e-mail protocol residing at the participant then executes steps 401–408.

After step 408 is executed, a zaplet 900 is displayed to an accessing participant. The zaplet 900 may include a banner 901 that includes information about the task to be completed. This information may include information from the fields 801, 804, 805, 806, and 807. The banner 901 may also include other information relevant to the zaplet.

The zaplet 900 may also include an interaction region 915 having fields 902, 903, and 904 and a dynamic content region 920. The dynamic content region 920 and the interaction region 915 may be merged. The field 904 may be used to accept comments from a participant concerning the task. The fields 902 and 903 may be used to receive the name of the responding participant and a network address, respectively. Once data is inputted into the interaction region 715 at step 507, the participant may then submit the zaplet 900 to the server 6 and step 508 using a submit button 905. A button 906 may be used to reset the contents of the fields 902, 903, 904, and any changes to the region 920.

The dynamic content region 920 may include textual or binary content. In this example, the dynamic content region 920 includes a spreadsheet having fields identified in the region 808 of the form 800. The dynamic content region 920 may also be updated by completing existing or additional cells 923 of the spreadsheet. Further, the dynamic content region 920 may also include graphics, buttons, and links that are integrated with the text described above.

FIG. 14 shows an updated image of the zaplet 900. The dynamic content region 920 includes the concatenated text corresponding to the input entered by a participant in the area 926 (FIG. 13) of the spreadsheet. Subsequent text input by the same or other participants in the group may be displayed in the same manner. In this way, a participant who accesses the zaplet, such as by clicking on an electronic mail message in his or her inbox, is able to view an aggregated list of responses before responding to the task allocation. Further, any participant can add new rows to the spreadsheet, which allows the other participants to fully view the tasks allotted to each participant. In another example, the zaplet may be used to support agent or server-based content collaboration. In this way, the participants receiving the zaplet can see current stock prices, news items, news alerts, sports alerts, or other similar content.

In another example, the zaplet may be used as a investment club stock tracker. Initially, one of the participants accesses a live electronic form 1000 (FIG. 15) by executing the step 501. The initiating participant may access the form 1000 similar to the form 100 described above. As shown in FIG. 15, the electronic form 1000 may include fields 1001, 1002, 1003, and 1004. The fields 1001, 1002, 1003, and 1004 are similar to the fields 801, 802, 803, and 804 described above. A field 1005 may also be included that is similar to the field 805 described above. The electronic form 1000 may also include a region 1006 that allows an initiating participant to specify details of different stocks that are to be retrieved, viewed, and accessed by the different participants listed in the field 1003. For example, the region 1006 may includes fields for "ticker" symbols, information about the number of shares owned, purchase price per share, trade history, commissions, and other notes. The region 1006 may also include fields to specify a deadline for picking certain investments. Once the initiating participant has completed the electronic form 1000, the form 1000 is then submitted to the server 6 in the step 502. The steps 503, 504, 505, and 506 are then executed.

The e-mail protocol residing at the participant then executes steps 401–408.

After step 408 is executed, a zaplet 1100 may then be displayed to an accessing participant. As shown in FIG. 16, the zaplet 1100 may include a banner 1101 that contains information entered into the fields 1001, 1004, and 1005 of the form 1000. The zaplet 1100 may also include an interaction region 1115 similar to the interaction region 915 described above and having the fields 1101, 1102, and 1104. The fields 1101, 1102, and 1104 are similar to the fields 902, 903, and 904 described above. The interaction region 1115 may also include buttons 1105 and 1106 that are similar to the buttons 905 and 906 described above.

The zaplet 1100 may also include dynamic content regions 1120, 1130, and 1140. The dynamic content region 1120 may include details specified in the region 1006. The data entered into the region 1120, such as "last trade", may be dynamically updated by a remote server or agent in data communication with the server 6.

The dynamic region 1130 may be used to track decisions using buttons 1150. In this example, the buttons 1150 correspond to "hold" and "sell". The investment decisions may be made by clicking on the button to highlight the selection in a conventional manner. The investment decisions using the buttons 1150 may be submitted using the button 1106. The dynamic content region 1140 may include comments received from the field 1104 and may be concatenated using the business logic, as described above.

FIG. 17 illustrates an updated image of the zaplet 1100. In this example, the dynamic content region 1120 includes updated stock information about the various selected stocks. The dynamic content region 1130 includes an updated status on the votes for investment decisions. Finally, the dynamic content region 1140 includes the concatenated text from the input by any of the participants. For example, "Suzie QQ" added "hold it all except Yahoo" that was entered into the fields 1101 and 1104, respectively.

The preferred group content collaboration tool is simple and allows participants to view current content at their point of interaction with the zaplet. This is because the zaplet is current when accessed or retrieved by any of the participants. Further, the preferred group content collaboration tool does not require proprietary access or configuration to view, modify, update, annotate, update, or delete the content. The preferred zaplet also permits a graceful combination of binary and textual content. This means that the participant can modify or add to the content without extra tools, such as plug-ins or editors. Additionally, the preferred tool supplies the look and feel of a live interaction without burdening the participant to be present in a real time conferencing environment. This is because the content is asynchronously dynamically updated and retrieved. Also, the content tool can support large numbers of participants. Moreover, the preferred tool helps avoid conflicts between participants. This is performed by allowing any participant to have parallel asynchronous access to the conflict while concurrently monitoring changes in the content. Finally, the preferred tool allows participants the flexibility of resolving their own conflicts by notifying the participant of the conflict and requesting a decision about how to resolve the conflict.

The methods and mechanisms described here are not limited to any particular hardware or software configuration, or to any particular communications modality, but rather they may find applicability in any communications or computer network environment.

The techniques described here may be implemented in hardware or software, or a combination of the two. Preferably, the techniques are implemented in computer programs executing one or more programmable computers that each includes a processor, a storage medium readable by the processor (including volatile and non-volatile memory and/or storage elements), and suitable input and output devices. The programmable computers may be either general-purpose computers or special-purpose, embedded systems. In either case, program code is applied to data entered with or received from an input device to perform the functions described and to generate output information. The output information is applied to one or more output devices.

Each program is preferably implemented in a high level procedural or object-oriented programming language to communicate with a computer system. However, the programs can be implemented in assembly or machine language, if desired. In any case, the language may be a compiled or interpreted language.

Each such computer program is preferably stored on a storage medium or device (e.g., CD-ROM, hard disk, magnetic diskette, or memory chip) that is readable by a general or special purpose programmable computer for configuring and operating the computer when the storage medium or device is read by the computer to perform the procedures described. The system also may be implemented as a- computer-readable storage medium, configured with a computer program, where the storage medium so configured causes a computer to operate in a specific and predefined manner.

A number of embodiments of the present invention have been described. Nevertheless, it will be understood that various modifications may be made without departing from the spirit and scope of the invention. For example, variations in the specification of which e-mail protocol a particular participant supports can be sent by the participant to the server 6 so that a different message format based on that knowledge can be forwarded to the participant. Accordingly, other embodiments are within the scope of the following claims.

APPENDIX A

```
1 Deliver Electronic (Authoring) Form
get ZAPLET_TYPE, ZAPLET_STYLE from request
open file ELECTRONIC_FORM for writing
write Creating_Participant_Input_Field(ZAPLET_TYPE, ZAPLET_STYLE) to
ELECTRONIC_FORM
write Creating_Participant_Email_Input_Field(ZAPLET_TYPE, ZAPLET_STYLE) to
ELECTRONIC_FORM
write Subject_Input_Field(ZAPLET_TYPE, ZAPLET_STYLE) to ELECTRONIC_FORM
write Recipients_Input_Field(ZAPLET_TYPE, ZAPLET_STYLE) to
ELECTRONIC_FORM
write Zaplet_Specific_Data_Input_Fields(ZAPLET_TYPE, ZAPLET_STYLE) to
ELECTRONIC_FORM
write Zaplet_Type_Constant(ZAPLET_TYPE, ZAPLET_STYLE) to
ELECTRONIC_FORM
write Zaplet_Style_Constant(ZAPLET_TYPE, ZAPLET_STYLE) to
ELECTRONIC_FORM
write Static_Form_Content(ZAPLET_TYPE, ZAPLET_STYLE) to ELECTRONIC_FORM
open stream CLIENT for writing
write ELECTRONIC_FORM to CLIENT
2 Receive Electronic (Authoring) Form Input and Send Mail
get CREATING_PARTICIPANT_NAME, CREATING_PARTICIPANT_EMAIL,
SUBJECT,
ZAPLET_TYPE,
        ZAPLET_STYLE, ZAPLET_SPECIFIC_DATA RECIPIENTS from request
set MESSAGE_ID = create_unique_id()
open file MESSAGE for writing
create (Message_Record(MESSAGE_ID, CREATING_PARTICIPANT_NAME,
CREATING_PARTICIPANT_EMAIL,
        SUBJECT, ZAPLET_TYPE, ZAPLET_STYLE, ZAPLET_SPECIFIC_DATA,
RECIPIENTS)) in
database
write MESSAGE_ID, CREATING_PARTICIPANT_NAME,
CREATING_PARTICIPANT_EMAIL,
        SUBJECT, ZAPLET_TYPE, ZAPLET_STYLE, ZAPLET_SPECIFIC_DATA,
RECIPIENTS to
MESSAGE
if (User_Record(CREATING_PARTICIPANT_EMAIL) not_exists_in database) {
        create User_Record(CREATING_PARTICIPANT_EMAIL,
CREATING_PARTICIPANT_NAME)
in database
}
foreach (USER_EMAIL in RECIPIENTS){
        if (User_Record(USER_EMAIL) not_exists_in database){
                create User_Record(USER_EMAIL) in database
        }
}
foreach (QUESTION in request) {
        set QUESTION_ID = create_unique_id()
        get QUESTION_CONTENT from request
        write QUESTION_ID, QUESTION_CONTENT to MESSAGE in database
        foreach (CHOICE in QUESTION) {
                set CHOICE_ID = create_unique_id()
                write CHOICE_ID, CHOICE to MESSAGE
        }
}
open file MAIL for writing
write (Transport_Headers(MESSAGE)) to MAIL
write ("From:" + Creating_Participant(MESSAGE)) to MAIL
write ("To:" + Recipients(MESSAGE)) to MAIL
write ("Subject:" + Subject(MESSAGE)) to MAIL
write (Encoding_Headers(MESSAGE)) to MAIL
write (ENCODING_SEPARATOR) to MAIL
write (PLAIN_TEXT_ENCODING_LABEL) to MAIL
write (Plain_Text_Static_Portion(MESSAGE)) to MAIL
write (URL_MESSAGE)) to MAIL
write (ENCODING_SEPARATOR) to MAIL
write (RICH_TEXT_ENCODING_LABEL) to MAIL
write (Rich_Text_Static_Portion(MESSAGE)) to MAIL
foreach (QUESTION in MESSAGE) {
```

APPENDIX A-continued

```
        write (Interaction_Form(QUESTION)) to MAIL
        write (Static_Portion(QUESTION)) to MAIL
        write (Dynamic_Image_Portion(QUESTION)) to MAIL
        write (IFRAME_ILAYER_Portion(QUESTION)) to MAIL
        write (IFRAME_ILAYER_Alternative_Portion(QUESTION)) to MAIL
}
write (ENCODING_SEPARATOR) to MAIL
if (SUPPORT_IMAGE_DATA)
        write (Image_Data(MESSAGE)) to MAIL
open stream TRANSPORT_SERVER for writing
write MAIL to TRANSPORT_SERVER
open file REPLY for writing
write Confirmation_Message(MAIL) to REPLY
open stream CLIENT for writing
write REPLY to CLIENT
3 Serve Dynamic Rich-Text Contents
get MESSAGE_ID from request
load MESSAGE by MESSAGE_ID from database
open file REPLY for writing
foreach (QUESTION in MESSAGE) {
        write (Format_Dynamic_Portion(QUESTION)) to REPLY
        foreach (RESPONSE in QUESTION){
                write (Format_Dynamic_Portion(RESPONSE)) to REPLY
        }
}
open stream CLIENT for writing
write REPLY to CLIENT
4 Serve Dynamic Image Contents
get MESSAGE_ID, QUESTION_ID from request
load QUESTION by QUESTION_ID from database
open file IMAGE for writing
write (Format_Image(QUESTION, Summarize(Responses(QUESTION)))) to IMAGE
open stream CLIENT for writing
write IMAGE to CLIENT
5 Receive Response Form Input
get MESSAGE_ID, QUESTION_ID, RESPONDER_NAME, RESPONDER_EMAIL,
COMMENT,
        QUESTION_SPECIFIC_INFO from request
if(User Record(RESPONDER_EMAIL) not_exists_in database){
        create User_Record(RESPONDER_EMAIL, RESPONDER_NAME) in database
}
if (Allowed_To_Respond(RESPONDER_EMAIL, QUESTION){
        create_or_update Response_Record(MESSAGE_ID, QUESTION_ID,
RESPONDER_EMAIL,
COMMENT, QUESTION_SPECIFIC_INFO) in database
}
open file REPLY for writing
get MESSAGE by MESSAGE_ID from database
write (Confirmation_View(MESSAGE)) to REPLY
open stream CLIENT for writing
write REPLY to CLIENT
6 Resend or Forward Message
get MESSAGE_ID NEW_RECIPIENT_EMAILS from request
foreach (USER_EMAIL in NEW_RECIPIENT_EMAILS){
        if (User_Record(USER_EMAIL) not_exists_in database){
                create User_Record(USER_EMAIL) in database
        }
}
get MESSAGE by MESSAGE_ID from database
set Recipients(MESSAGE) = Recipients(MESSAGE)+NEW_RECIPIENT_EMAILS
update Message_Record(MESSAGE) in database
open file MAIL for writing
write (Transport_Headers(MESSAGE)) to MAIL
write ("From:" + Creating_Participant(MESSAGE)) to MAIL
write ("To:" + NEW_RECIPIENT_EMAILS) to MAIL
write ("Subject:" + Subject(MESSAGE)) to MAIL
write (Encoding_Headers(MESSAGE)) to MAIL
write (ENCODING_SEPARATOR) to MAIL
write (PLAIN_TEXT_ENCODING_LABEL) to MAIL
write (Plain_Text_Static_Portion(MESSAGE)) to MAIL
write (URL(MESSAGE)) to MAIL
write (ENCODING_SEPARATOR) to MAIL
write (RICH_TEXT_ENCODING_LABEL) to MAIL
write (Rich_Text_Static_Portion(MESSAGE)) to MAIL
foreach (QUESTION in MESSAGE) {
        write (Interaction_Form(QUESTION)) to MAIL
        write (Static_Portion(QUESTION)) to MAIL
        write (Dynamic_Image_Portion(QUESTION)) to MAIL
        write (IFRAME_ILAYER_Portion(QUESTION)) to MAIL
```

APPENDIX A-continued

```
        write (IFRAME_ILAYER_Alternative_Portion(QUESTION)) to MAIL
}
write (ENCODING_SEPARATOR) to MAIL
if(SUPPORT_IMAGE_DATA)
write (Image_Data(MESSAGE)) to MAIL
open stream TRANSPORT_SERVER for writing
write MAIL to TRANSPORT_SERVER
open file REPLY for writing
write Confirmation_Message(MAIL) to REPLY
open stream CLIENT for writing
write REPLY to CLIENT
```

What is claimed is:

1. A network system for content collaboration among a group of participants, comprising:
    a server having an associated database and adapted to be used in the network;
    an electronic medium stored in the database;
    at least one dynamic content region in the electronic medium having binary dynamic content;
    an interface region in the electronic medium to accept input from one of any of the participants and an external source in data communication with the server; and
    logic in communication with the database for performing the steps of:
        generating and sending a first e-mail message to one or more selected participants among the group, wherein the first e-mail message is associated with the electronic medium, wherein the first e-mail message is configured to cause a first e-mail client of one of the selected participants to parse the first e-mail message in response to that selected participant opening the e-mail message to result in displaying, in the first e-mail client, dynamic content associated with the dynamic content region of the electronic medium;
        receiving, at the server, from one or more of the selected participants, one or more updates to the dynamic content;
        updating one or more of the dynamic content regions of the electronic medium based on the one or more updates;
        receiving information specifying opening the first e-mail message from any other second participant among the selected participants; and
        providing the dynamic content of the electronic medium, including all then-current updates, to a second e-mail client associated with the second participant for display therein in association with the first electronic message.

2. The network system of claim 1, wherein the binary content comprises one of images, streaming media, a virtual white board, group greeting cards, and text.

3. The network system of claim 1, wherein the electronic medium is adapted for use with both an electronic mail and Internet protocol.

4. The network system of claim 1, wherein the server is configured to send the first electronic message after receiving an electronic form from one of the participants in the group, wherein the electronic form defines the dynamic content in the electronic medium.

5. The network system of claim 4, wherein the electronic form comprises one of a list of network addresses corresponding to any of the participants and a region for supplying details about the binary content.

6. The network system of claim 1, wherein the binary content comprises one of a table, list, document, spread sheet, outline, form, calendar, and slide presentation.

7. The network system of claim 1, wherein the external source is operable to supply one of news feeds, sports scores, and stock quotes to the server.

8. The network system of claim 1, wherein the external source is one of an agent and a server.

9. The network system of claim 1, wherein the server further comprises logic to resolve conflicts between selected ones of the inputs by any of the participants.

10. The network system of claim 1, wherein the server further comprises logic to track the input by any of the participants.

11. A method of content collaboration among a group of participants, comprising:
    generating an electric form having a plurality of network addresses associated with the participants and a region for specifying details about a plurality of binary content;
    sending the electronic form to a server;
    receiving, at an e-mail client associated with one of the participants, a first e-mail message for the group;
    parsing the first e-mail message received by at least one of the participants from the server in response to that participant opening the first e-mail message;
    receiving, at the e-mail client, dynamic content associated with an electronic medium having at least one dynamic content region that was served to the e-mail client in response to opening the e-mail message, wherein the electronic medium is stored in the server and wherein the at least one dynamic content region includes at least a portion of the binary content;
    providing one or more updates to the dynamic content by interacting with the first electronic message using the e-mail client;
    opening the first e-mail message; and
    receiving the dynamic content of the electronic medium, including all then-current updates, for display in association with the first electronic message.

12. The method of claim 11, wherein the at least one dynamic content region further comprises textual content and the updating step further comprises updating the textual content in response to one of input from any of the participants and an external source in data communication with the server.

13. The method of claim 11, wherein the generating step further comprises importing the binary content into the electronic form.

14. The method of claim 11, wherein the generating step further comprises referencing the binary content using a link identifier.

15. The method of claim 14, wherein the link identifier is a Universal Resource Locator.

16. The method of claim 11, wherein the updating step further comprises receiving the input from any of the participants from an interaction region, a portion of the interaction region being embedded in the electronic medium.

17. The method of claim 15, wherein the dynamic content region and the interaction region are merged.

18. The method of claim 11, further comprising configuring the server to support one of an Internet and electronic mail protocol.

19. The method of claim 11 further comprising resolving conflicts between the inputs from any of the participants.

20. The method of claim 11, wherein the updating step further comprises updating the binary content to reflect a current state of the binary content.

21. A method of content collaboration among a group of participants, comprising:
- generating an electronic form having a plurality of network addresses associated with the participants and a region for specifying details about a plurality of textual content;
- sending the electronic form to a server;
- receiving, at an e-mail client associated with one of the participants, a first e-mail message for the group;
- parsing the first e-mail message received by at least one of the participants from the server in response to that participant opening the fit email message;
- receiving, at the e-mail client, dynamic content associated with an electronic medium having at least one dynamic content region tat was served to the e-mail client in response to opening the first e-mail message, wherein the electronic medium is stored in the server and wherein the at least one dynamic content region includes at least a portion of the textual content;
- providing one or mote textual content updates to the dynamic content by interacting with the first electronic message using the e-mail client;
- opening the first e-mail message; and
- receiving the dynamic content of the electronic medium, including all then-current textual content updates for display in association with the first electronic message.

22. The method of claim 21, wherein the at least one dynamic content region further comprises binary content and the updating step further comprises updating the binary content in response to one of input from any of the participants and an external source in data communication with the server.

23. The method of claim 21, wherein the updating steps further comprises concatenating the input from any of the participants.

24. A method for managing task among a group of participants, comprising:
- generating an electronic form having a plurality of network addresses associated with the participants and a region for specifying details about the tasks to be allocated;
- sending the electronic form to a server,
- receiving, at an e-mail client associated with one of the participants, a first e-mail message for the group;
- parsing the first e-mail message received by at least one of the participants from the server in response to that participant opening the first e-mail message;
- receiving, at the e-mail client, dynamic content associated with an electronic medium having at least one dynamic content region that was served to the e-mail client in response to opening the first e-mail message, wherein the electronic medium is stored in the server and wherein the at least one dynamic content region includes dynamic content having allocated tasks;
- providing one or more allocated task updates to the dynamic content by interacting with the first electric message using the e-mail client;
- opening the first e-mail message; and
- receiving the dynamic content of the electronic medium, including all then-current allocated task updates, for display in association with the first electronic message.

25. The method of claim 24, wherein dynamic content further comprises a table.

26. The method of claim 25, wherein the information is updated in response to input into the table by any of the participants.

27. The method of claim 24, wherein the electronic medium further comprises an interaction region and wherein the dynamic content region and the interaction region are merged.

28. A network system including a plurality of content terminals, comprising:
- at least one data processing machine located at each of the client terminals; and
- computer software, residing on a computer readable medium at each machine to cause the machine to perform the following operations:
  - generating an electronic form having a plurality of network addresses associated with the participants and details about binary content to be distributed to the plurality of network addresses;
  - sending the electronic form to a server;
  - receiving, at an e-mail client associated with one of the participants, a first e-mail message for the group;
  - parsing the first e-mail message received by at least one of the participants from the server in response to that participant opening the first e-mail message;
  - receiving, at the e-mail client, dynamic content associated with an electronic medium having at least one dynamic content region that was served to the e-mail client in response to opening the e-mail message, wherein the electronic medium is stored in the server and wherein the dynamic content regions include a then current dynamic content representative of the binary content;
  - providing one or more updates to the dynamic content by interacting with the first electronic message using the e-mail client;
  - opening the first e-mail message; and
  - receiving the dynamic content of the electronic medium, including all then-current updates, for display in association with the first electronic message.

29. Computer software, residing on a computer readable medium at a device connected to a network, comprising instructions to cause the device to perform the following operations:
- at least one data processing machine located at each of the client terminals; and computer software, residing on a computer readable medium at each machine to cause the machine to perform the following operations:
  - generating an electronic form having a plurality of network addresses associated with the participants and details about binary content to be distributed to the plurality of network addresses;
  - sending the electronic form to a server; receiving, at an e-mail client associated with one of the participants, a first e-mail message for the group;

parsing the first e-mail message received by at lent one of the participants from the server in response to that participant opening the first e-mail message;

receiving, at the e-mail client, dynamic content associated with an electronic medium having at lest one dynamic content region that was served to the e-mail client in response to opening the e-mail message, wherein the electronic medium is stored in the server and wherein the dynamic content regions include a then current dynamic content representative of the binary content;

providing one or more updates to the dynamic content by interacting with the first electronic message using the e-mail client;

opening the first e-mail message; and receiving the dynamic content of the electronic medium, including all then-current updates, for display in association with the first electronic message.

30. A network system for content collaboration among a group of participants, comprising:

a server having an associated database and adapted to be used in the network;

an electronic medium that is stored in the database of the server;

at least one dynamic content region in the electronic medium having binary dynamic content;

an interface region in the electronic medium to accept input representing one or more updates to the dynamic content from any of the participants or an external source in data communication with the server; and logic in communication with the database for performing the steps of:

generating and sending a first e-mail message to one or more selected participants among the group, wherein the first e-mail message is associated with the electronic medium, wherein the first e-mail message is configured to cause a first e-mail client of one of the selected participants to parse the first e-mail message in response to that selected participant opening the e-mail message to result in displaying, in the first e-mail client, dynamic content associated with the dynamic content region of the electronic medium;

receiving, at the server, from one or more of the selected participants, one or more updates to the dynamic content provided by interacting with the interface region using e-mail clients;

updating one or more of the dynamic content regions of the electronic medium based on the one or more updates;

receiving information specifying opening the first e-mail message from any other second participant among the selected participants; and automatically sending the dynamic content of the electronic medium, including all then-current updates, to a second e-mail client associated with the second participant for display therein in association with the first electronic message.

* * * * *

UNITED STATES PATENT AND TRADEMARK OFFICE
CERTIFICATE OF CORRECTION

PATENT NO. : 6,507,865 B1
DATED : January 14, 2003
INVENTOR(S) : Hanson et al.

It is certified that error appears in the above-identified patent and that said Letters Patent is hereby corrected as shown below:

Column 24,
Line 31, replace "electric" with -- electronic --.

Column 25,
Line 29, replace "fit email" with -- first e-mail --.
Line 32, replace "tat" with -- that --.
Line 37, replace "mote" with -- more --.
Line 51, replace "steps" with -- step --.
Line 54, replace "task" with -- tasks --.
Line 60, replace "," with -- ; --.

Column 27,
Line 1, replace "lent" with -- least --.
Line 5, replace "lest" with -- least --.

Signed and Sealed this

Twenty-fifth Day of March, 2003

JAMES E. ROGAN
*Director of the United States Patent and Trademark Office*